(12) United States Patent
Oh et al.

(10) Patent No.: US 12,038,631 B2
(45) Date of Patent: Jul. 16, 2024

(54) SPATIALLY-PATTERNED SWITCHABLE LC WAVEPLATES FOR A WIDE VIEWING APERTURE

(71) Applicant: Meta Platforms Technologies, LLC, Menlo Park, CA (US)

(72) Inventors: Chulwoo Oh, Sammamish, WA (US); Hsien-Hui Cheng, Woodinville, WA (US); Xiaoze Ou, Mountain View, CA (US); Linghui Rao, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 18/063,899

(22) Filed: Dec. 9, 2022

(65) Prior Publication Data

US 2024/0192529 A1  Jun. 13, 2024

(51) Int. Cl.
| | | |
|---|---|---|
| *G02F 1/03* | (2006.01) | |
| *G02F 1/13363* | (2006.01) | |
| *G02F 1/1337* | (2006.01) | |
| *G02B 27/01* | (2006.01) | |
| *G02F 1/1335* | (2006.01) | |
| *G02F 1/1343* | (2006.01) | |

(52) U.S. Cl.
CPC ...... *G02F 1/0311* (2013.01); *G02F 1/133636* (2013.01); *G02F 1/133638* (2021.01); *G02F 1/133749* (2021.01); *G02B 27/0172* (2013.01); *G02F 1/133531* (2021.01); *G02F 1/134363* (2013.01)

(58) Field of Classification Search
None
See application file for complete search history.

(56) References Cited

U.S. PATENT DOCUMENTS

2020/0326574 A1 * 10/2020 Jamali .............. G02F 1/133632

* cited by examiner

*Primary Examiner* — Dung T Nguyen
(74) *Attorney, Agent, or Firm* — Weaver Austin Villeneuve & Sampson LLP

(57) ABSTRACT

A switchable waveplate includes a substrate, a first electrode layer on the substrate, an alignment layer on the first electrode layer and including alignment patterns formed thereon, a liquid crystal layer on the alignment layer, and a second electrode layer on the liquid crystal layer. The alignment patterns are determined based on angles of interest at a plurality of regions of the switchable waveplate. The liquid crystal layer includes liquid crystal molecules that are arranged according to the alignment patterns and are pre-tilted when no electric field is applied to the liquid crystal layer. The first electrode layer and the second electrode layer are configured to apply electric fields of different magnitudes to a plurality of zones of the switchable waveplate.

18 Claims, 19 Drawing Sheets

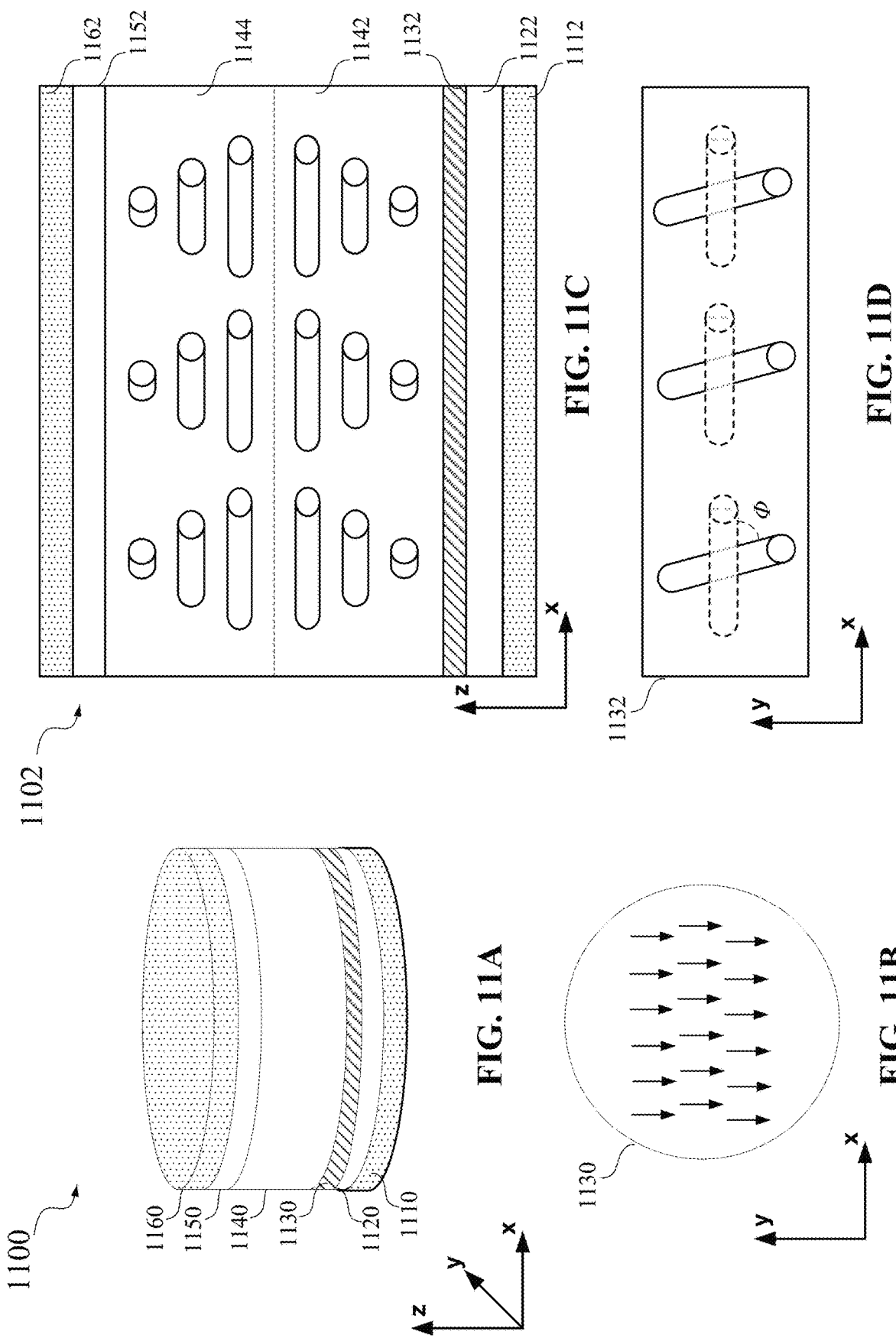

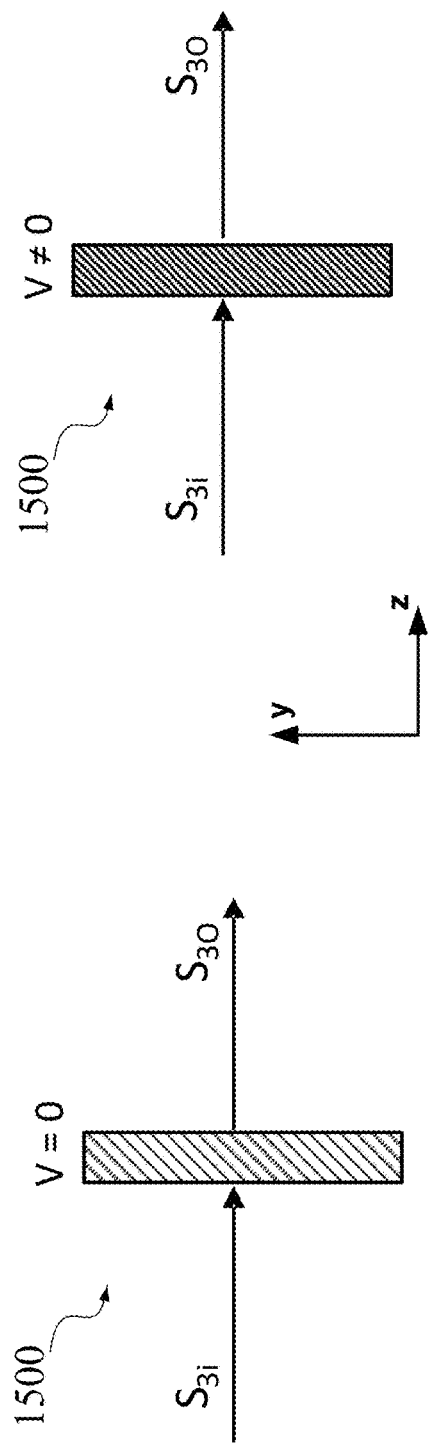
FIG. 15A
FIG. 15C
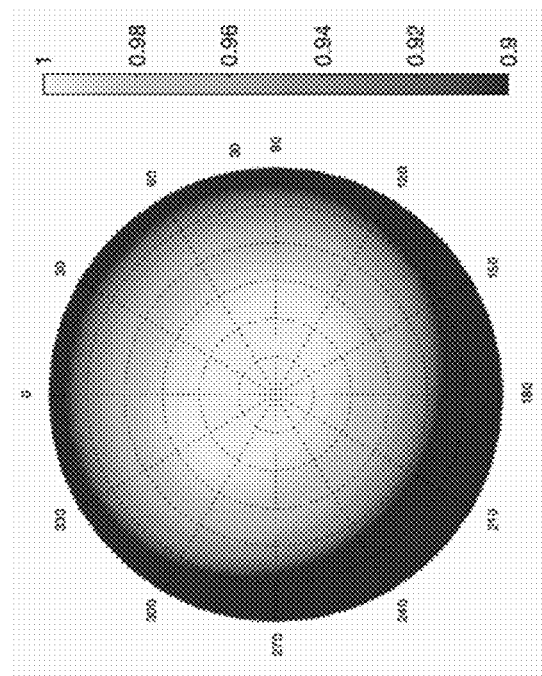
FIG. 15D
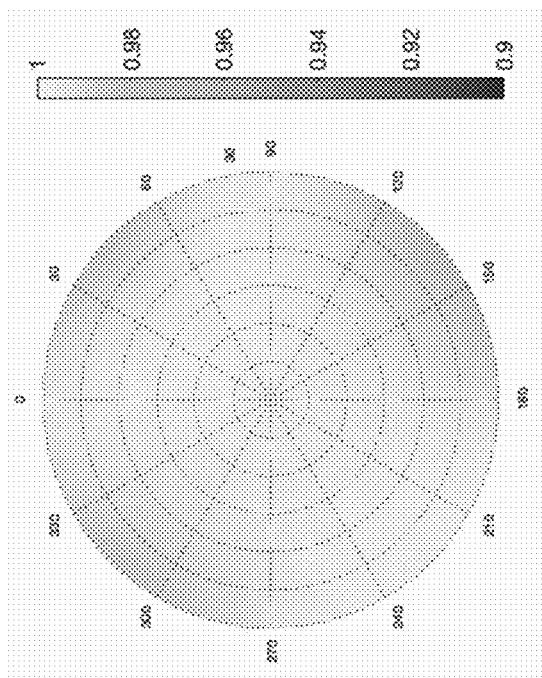
FIG. 15B

SPATIALLY-PATTERNED SWITCHABLE LC WAVEPLATES FOR A WIDE VIEWING APERTURE

BACKGROUND

An artificial reality system, such as a head-mounted display (HMD) or heads-up display (HUD) system, generally includes a near-eye display system in the form of a headset or a pair of glasses and configured to present content to a user via an electronic or optic display within, for example, about 10-20 mm in front of the user's eyes. The near-eye display system may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through).

A near-eye display generally includes an optical system configured to form an image of a computer-generated image on an image plane. The optical system of the near-eye display may relay the image generated by an image source (e.g., a display panel) to create a virtual image that appears to be away from the image source and further than just a few centimeters away from the user's eyes. For example, the optical system may collimate the light from the image source or otherwise convert spatial information of the displayed virtual objects into angular information to create a virtual image that may appear to be far away. The optical system may also magnify the image source to make the image appear larger than the actual size of the image source. It is generally desirable that the optical system of a near-eye display has a small size, a low weight, a large field of view, a large eye box, a high efficiency, and a low cost.

SUMMARY

This disclosure relates generally to switchable waveplates. More specifically, and without limitation, techniques disclosed herein relate to liquid crystal based switchable waveplates with spatially varying liquid crystal structures and electric fields to achieve high performance (e.g., low polarization leakage) over a large view aperture and a large field of view. Various inventive embodiments are described herein, including devices, systems, methods, structures, materials, processes, and the like.

According to certain embodiments, a switchable waveplate may include a substrate, a first electrode layer on the substrate, an alignment layer on the first electrode layer and including alignment patterns formed thereon, a liquid crystal layer on the alignment layer, and a second electrode layer on the liquid crystal layer. The alignment patterns may be determined based on angles of interest at a plurality of regions of the switchable waveplate. The liquid crystal layer may include liquid crystal molecules that are arranged according to the alignment patterns and are pre-tilted when no electric field is applied to the liquid crystal layer. The first electrode layer and the second electrode layer may be configured to apply electric fields of different magnitudes to a plurality of zones of the switchable waveplate.

In some embodiments of the switchable waveplate, liquid crystal molecules on opposite sides of a center of the liquid crystal layer may be pre-tilted in opposite directions. For example, the liquid crystal molecules may be pre-tilted by angles between 1° and 5°. In some embodiments, the liquid crystal layer may include two twisted nematic liquid crystal sublayers with opposite liquid crystal twist angles along a surface-normal direction of the substrate. The two twisted nematic liquid crystal sublayers may be characterized by liquid crystal twist angels of, for example, −70° and 70°, respectively.

In some embodiments of the switchable waveplate, at least one of the first electrode layer or the second electrode layer may include electrically isolated zones configured to receive different voltage signals. In some embodiments, at least one of the first electrode layer or the second electrode layer includes a conductive material characterized by a first electric resistivity that is selected to generate a voltage gradient from a center to an edge of the switchable waveplate, where a total voltage drop from the center to the edge of the switchable waveplate may be greater than, for example, 5 V.

In some embodiments of the switchable waveplate, the plurality of zones of the switchable waveplate may include a center zone and one or more ring-shaped zones. Each ring-shaped zone of the one or more ring-shaped zones may include a plurality of sectors corresponding to a plurality of azimuth angle ranges. Each sector of the plurality of sectors may include a region of the plurality of regions. The alignment layer in each sector of the plurality of sectors may be characterized by a respective alignment pattern orientation. In some embodiments, the alignment patterns, the pre-tilt angles of the liquid crystal molecules, and the electric fields of different magnitudes applied to the plurality of zones of the switchable waveplate may be selected to align long axes of liquid crystal molecules in each region of the plurality of regions of the switchable waveplate with an angle of interest at the region of the plurality of regions of the switchable waveplate.

According to certain embodiments, a near-eye display system may include a light source, a polarizer configured to polarize light emitted by the light source, a first polarization sensitive lens characterized by different optical power for light of two different polarization states, and a switchable waveplate between the polarizer and the first polarization sensitive lens. The switchable waveplate may include a substrate, a first electrode layer on the substrate, an alignment layer on the first electrode layer and including alignment patterns formed thereon, a liquid crystal layer on the alignment layer, and a second electrode layer on the liquid crystal layer. The alignment patterns may be determined based on angles of interest at a plurality of regions of the switchable waveplate. The liquid crystal layer may include liquid crystal molecules that are arranged according to the alignment patterns and are pre-tilted when no electric field is applied to the liquid crystal layer. The first electrode layer and the second electrode layer may be configured to apply electric fields of different magnitudes to a plurality of zones of the switchable waveplate.

In some embodiments of the near-eye display system, liquid crystal molecules on opposite sides of a center of the liquid crystal layer may be pre-tilted in opposite directions. The switchable waveplate may be an achromatic waveplate when no electric field is applied to the liquid crystal layer, and the liquid crystal layer may include two twisted nematic liquid crystal sublayers with opposite liquid crystal twist angles along a surface-normal direction of the substrate. In some embodiments, at least one of the first electrode layer or the second electrode layer may include electrically isolated zones configured to receive different voltage signals. In some embodiments, at least one of the first electrode layer or the second electrode layer may include conductive zones connected by resistive components. In some embodiments, at least one of the first electrode layer or the second electrode layer may include a conductive material characterized by a first electric resistivity that is selected to generate a voltage gradient from a center to an edge of the switchable waveplate.

In some embodiments of the near-eye display system, the alignment patterns, the pre-tilt angles of the liquid crystal molecules, and the electric fields of different magnitudes applied to the plurality of zones of the switchable waveplate may be selected to align long axes of liquid crystal molecules in each region of the plurality of regions of the switchable waveplate with an angle of interest at the region of the plurality of regions of the switchable waveplate. In some embodiments, the near-eye display system may also include a second polarization sensitive lens, where the second polarization sensitive lens may be between the polarizer and the switchable waveplate, or between the switchable waveplate and the first polarization sensitive lens. In some embodiments, the near-eye display system may also include a retardance compensator configured to compensate retardance variation of the switchable waveplate when no electric field is applied to the liquid crystal layer.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIGS. 11A-11B illustrate an example of a switchable waveplate.

FIGS. 11C-11D illustrate an example of an achromatic switchable waveplate including double twisted nematic liquid crystal layers.

FIG. 15A illustrates an example of a switchable half-wave plate with no voltage signal applied (in the OFF state).

FIG. 15B includes a polar plot illustrating the output Stokes parameter $S_{3O}$ of the output light of the switchable half-wave plate of FIG. 15A with no voltage signal applied.

FIG. 15C illustrates an example of a switchable half-wave plate with a voltage signal applied (in the ON state).

FIG. 15D includes a polar plot illustrating the output Stokes parameter $S_{3O}$ of the output light of the switchable half-wave plate of FIG. 15C with a voltage signal applied.

Figure 1:
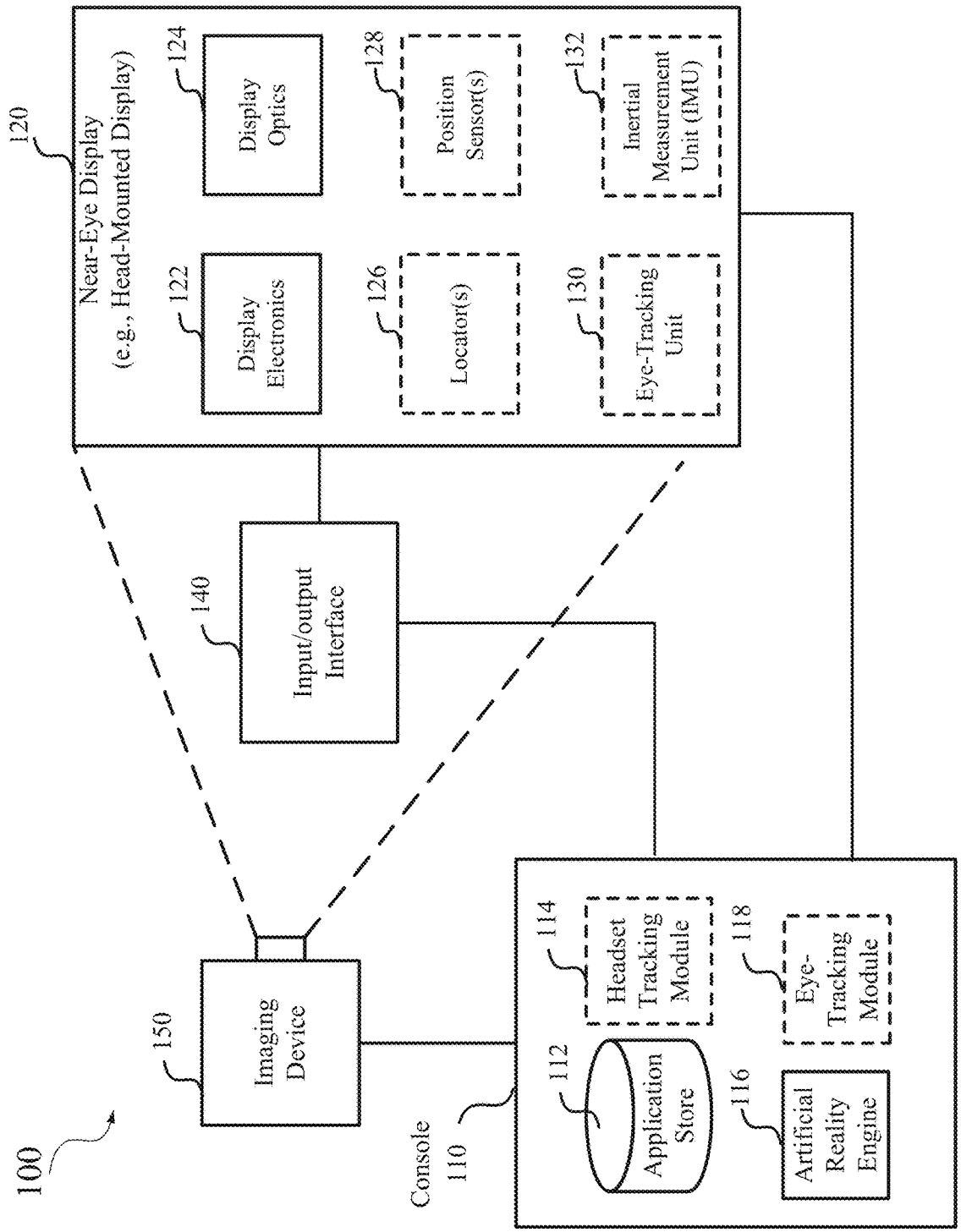
FIG. 1 is a simplified block diagram of an example of an artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This disclosure relates generally to switchable waveplates. More specifically, and without limitation, techniques disclosed herein relate to liquid crystal based switchable waveplates with spatially varying liquid crystal structures and electric fields to achieve high performance (e.g., low polarization leakage) over a large view aperture and a large field of view Various inventive embodiments are described herein, including devices, systems, methods, structures, materials, processes, and the like.

Augmented reality (AR) and virtual reality (VR) applications may use near-eye displays (e.g., head-mounted displays) to present images to users. In some near-eye display systems, polarization sensitive lenses (e.g., Pancharatnam Berry Phase (PBP) lenses) may be used to project the displayed images to user's eyes. The polarization sensitive lens may diffract light of a first polarization state (e.g., right-handed circular polarization (RHCP) or left-handed circular polarization (LHCP)) by a certain diffraction angle into a first (e.g., +1) diffraction order, and may diffract light of a second polarization state (e.g., LHCP or RHCP) by a different diffraction angle into another (e.g., −1) diffraction order. Thus, the polarization sensitive lens may have different optical powers for light of different polarization states, and may, for example, collimate or focus light in a first circular polarization state while diverging light in a second circular polarization state. Due to the different optical powers of the polarization sensitive lens for light of different polarization states, polarization sensitive lens may be used with switchable polarization converters (e.g., switchable waveplates) to display images onto different image planes at different distances from user's eyes.

Switchable waveplates may be switchable between an ON state and an OFF state based on the applied electrical signals. For example, when no voltage signal is applied to a switchable waveplate, the switchable waveplate may be in the OFF state and may provide a first phase retardation (e.g., a quarter wavelength or a half wavelength) between light of two orthogonal polarization states. When a voltage signal is applied to the switchable waveplate, the switchable waveplate may be in the ON state and may provide a second phase retardation (e.g., zero) between light of two orthogonal polarization states. Switchable waveplates may be used in many polarization sensitive optical systems.

Both polarization sensitive lenses and switchable waveplates may be made using birefringent materials such as liquid crystal (LC) polymer layers, and can be made flat. For example, switchable waveplates may be fabricated by coating liquid crystal polymer materials on an alignment layer with alignment patterns formed thereon. The alignment patterns may be formed by, for example, photoalignment or nanoimprint techniques. The liquid crystal polymer materials may be coated on the patterned surface of the alignment layer, for example, layer by layer, until a desired thickness and/or twist angle is reached. A curing (e.g., UV or thermal curing) process may be performed to cure the liquid crystal polymer materials and fix the twist pattern of the liquid crystal molecules.

Polarization sensitive lenses and switchable waveplates generally have uniform designs that are optimized for incident light with small incident angles (e.g., surface-normal incident light or paraxial light) across the apertures of the switchable waveplates. Due to limitations of the structures (e.g., alignment pattern, tilt angle, and electric field applied) and the material (e.g., liquid crystal) properties, polarization sensitive lenses and switchable waveplates (in either the ON state or the OFF state) may have limited angular bandwidth, and may have lower performance (e.g., low efficiency and/or high polarization leakage) for incident light with large incident angles (e.g., light from a large field of view).

According to certain embodiments, to improve the performance of switchable waveplates for larger fields of view and/or off-axis incidence, switchable waveplates may be made to have spatially variable liquid crystal structures, and may be configured to apply spatially variable electric field to the liquid crystal structures in the ON state. For example, a switchable waveplate may have spatially variable LC alignment orientations across its aperture in the alignment layer, and may have spatially variable LC molecule pre-tilt angle with respect to the alignment layer with no voltage signal applied. The LC alignment orientation, LC molecule pre-tilt angle, and electric field applied at a position of the switchable waveplate can be selected to substantially align the LC molecules with the angle of interest (AOI) at the position, to reduce polarization leakage in the ON state for incident light from the AOI at the position. The spatially variable LC structures may be achieved using various fabrication techniques. In some embodiments, the switchable waveplate may include double twist nematic liquid crystal layers configured to achieve achromatic retardance and polarization conversion. In some embodiments, the switchable waveplate may include a patterned compensator that is configured to provide spatially mapped compensation for retardance variations in the OFF state when no voltage signal is applied to the switchable waveplate.

The switchable waveplates described herein may be used in conjunction with various technologies, such as an artificial reality system. An artificial reality system, such as a head-mounted display (HMD) or heads-up display (HUD) system, generally includes a display configured to present artificial images that depict objects in a virtual environment. The display may present virtual objects or combine images of real objects with virtual objects, as in virtual reality (VR), augmented reality (AR), or mixed reality (MR) applications. For example, in an AR system, a user may view both displayed images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through).

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (µLED) display, an active-matrix OLED display (AMO-LED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be an LED, a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and an eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or any combination thereof, to predict a future location of near-eye display 120. Headset tracking module 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to determine the eye's orientation more accurately.

Figure 2:
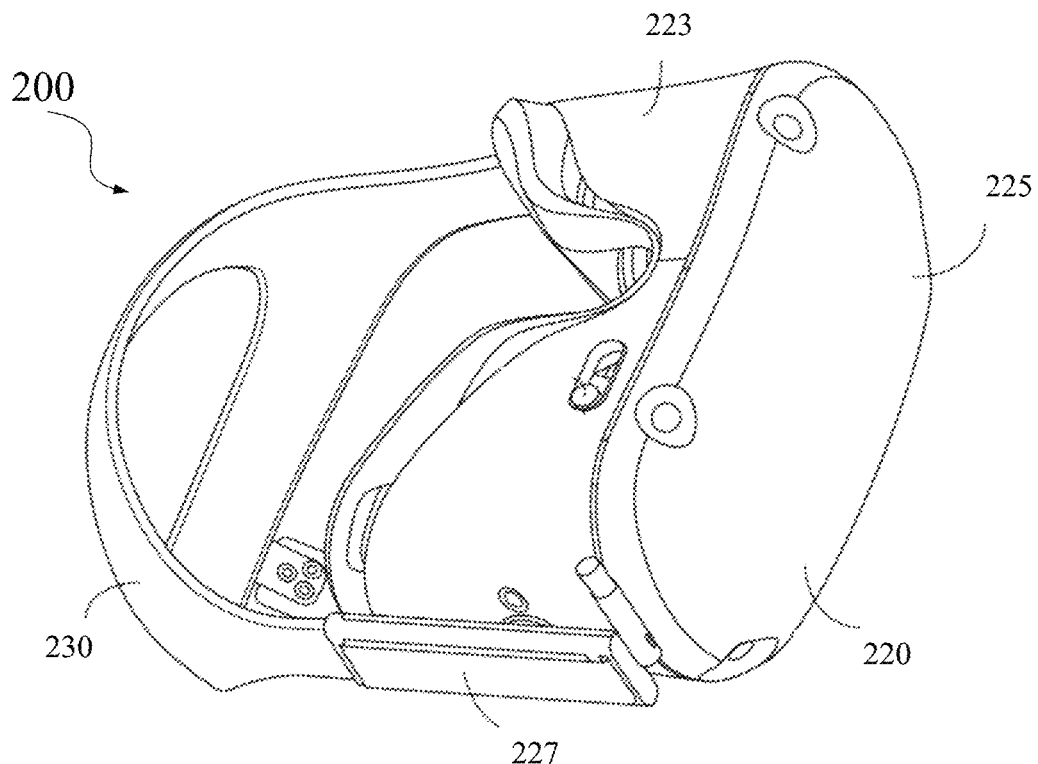
FIG. 2 is a perspective view of an example of a near-eye display in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a µLED display, an AMOLED, a TOLED, some other display, or any combination thereof. HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
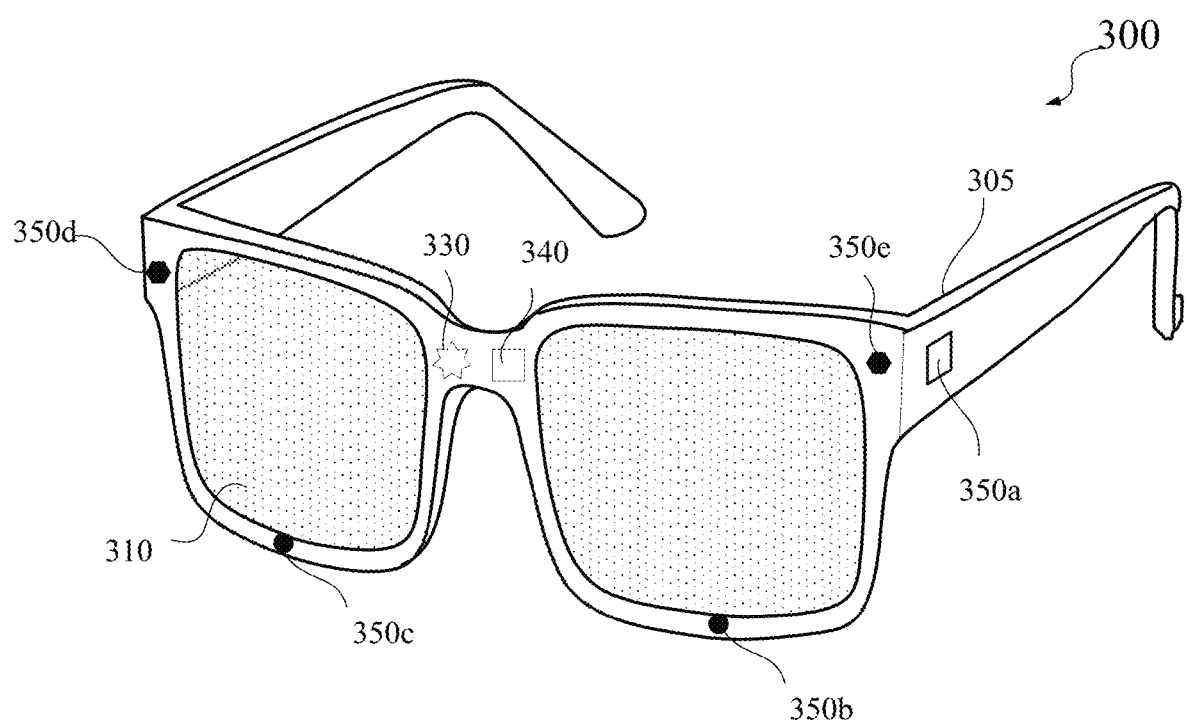
FIG. 3 is a perspective view of an example of a near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350*a*, 350*b*, 350*c*, 350*d*, and 350*e* on or within frame 305. In some embodiments, sensors 350*a*-350*e* may include one or more depth sensors, motion sensors, position sensors, inertial sensors, or ambient light sensors. In some embodiments, sensors 350*a*-350*e* may include one or more image sensors configured to generate image data representing different fields of views in different directions. In some embodiments, sensors 350*a*-350*e* may be used as input devices to control or influence the displayed content of near-eye display 300, and/or to provide an interactive VR/AR/MR experience to a user of near-eye display 300. In some embodiments, sensors 350*a*-350*e* may also be used for stereoscopic imaging.

In some embodiments, near-eye display 300 may further include one or more illuminators 330 to project light into the physical environment. The projected light may be associated with different frequency bands (e.g., visible light, infrared light, ultra-violet light, etc.), and may serve various purposes. For example, illuminator(s) 330 may project light in a dark environment (or in an environment with low intensity of infrared light, ultra-violet light, etc.) to assist sensors 350*a*-350*e* in capturing images of different objects within the dark environment. In some embodiments, illuminator(s) 330 may be used to project certain light patterns onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
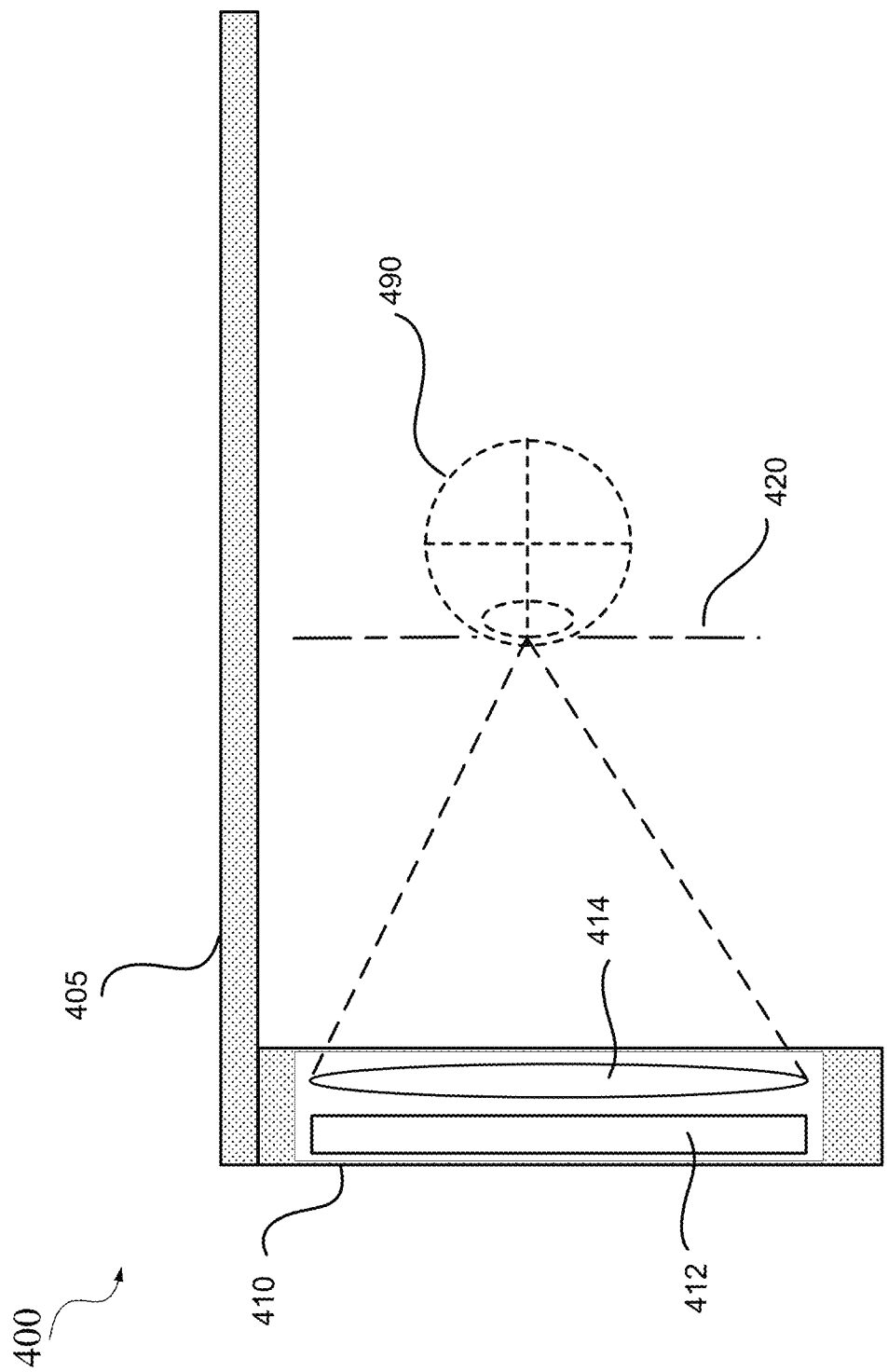
FIG. 4 is a cross-sectional view of an example of a near-eye display according to certain embodiments.

FIG. 4 is a cross-sectional view of an example of a near-eye display 400 according to certain embodiments. Near-eye display 400 may include at least one display assembly 410. Display assembly 410 may be configured to direct image light (e.g., display light) to an eyebox located at an exit pupil 420 and to user's eye 490. It is noted that, even though FIG. 4 and other figures in the present disclosure show an eye of a user of the near-eye display for illustration purposes, the eye of the user is not a part of the corresponding near-eye display.

As HMD device 200 and near-eye display 300, near-eye display 400 may include a frame 405 and display assembly 410 that may include a display 412 and/or display optics 414 coupled to or embedded in frame 405. As described above, display 412 may display images to the user electrically (e.g., using LCDs, LEDs, OLEDs) or optically (e.g., using a waveguide display and optical couplers) according to data received from a processing unit, such as console 110. In some embodiments, display 412 may include a display panel that includes pixels made of LCDs, LEDs, OLEDs, and the like. Display 412 may include sub-pixels to emit light of a predominant color, such as red, green, blue, white, or yellow. In some embodiments, display assembly 410 may include a stack of one or more waveguide displays including, but not restricted to, a stacked waveguide display, a varifocal waveguide display, and the like. The stacked waveguide display may be a polychromatic display (e.g., a red-green-blue (RGB) display) created by stacking waveguide displays whose respective monochromatic sources are of different colors.

Display optics 414 may be similar to display optics 124 and may display image content optically (e.g., using optical waveguides and optical couplers), correct optical errors associated with the image light, combine images of virtual objects and real objects, and present the corrected image light to exit pupil 420 of near-eye display 400, where the user's eye 490 may be located. In some embodiments, display optics 414 may also relay the images to create virtual images that appear to be away from display 412 and further than just a few centimeters away from the eyes of the user. For example, display optics 414 may collimate the image source to create a virtual image that may appear to be far away (e.g., greater than about 0.3 m, such as about 0.5 m, 1 m, or 3 m away) and convert spatial information of the displayed virtual objects into angular information. In some embodiments, display optics 414 may also magnify the source image to make the image appear larger than the actual size of the source image. More details of display 412 and display optics 414 are described below.

In various implementations, the optical system of a near-eye display, such as an HMD, may be pupil-forming or non-pupil-forming. Non-pupil-forming HMDs may not use intermediary optics to relay the displayed image, and thus the user's pupils may serve as the pupils of the HMD. Such non-pupil-forming displays may be variations of a magnifier (sometimes referred to as "simple eyepiece"), which may magnify a displayed image to form a virtual image at a greater distance from the eye. The non-pupil-forming display may use fewer optical elements. Pupil-forming HMDs may use optics similar to, for example, optics of a compound microscope or telescope, and may include some forms of projection optics that magnify an image and relay it to the exit pupil.

Figure 5:
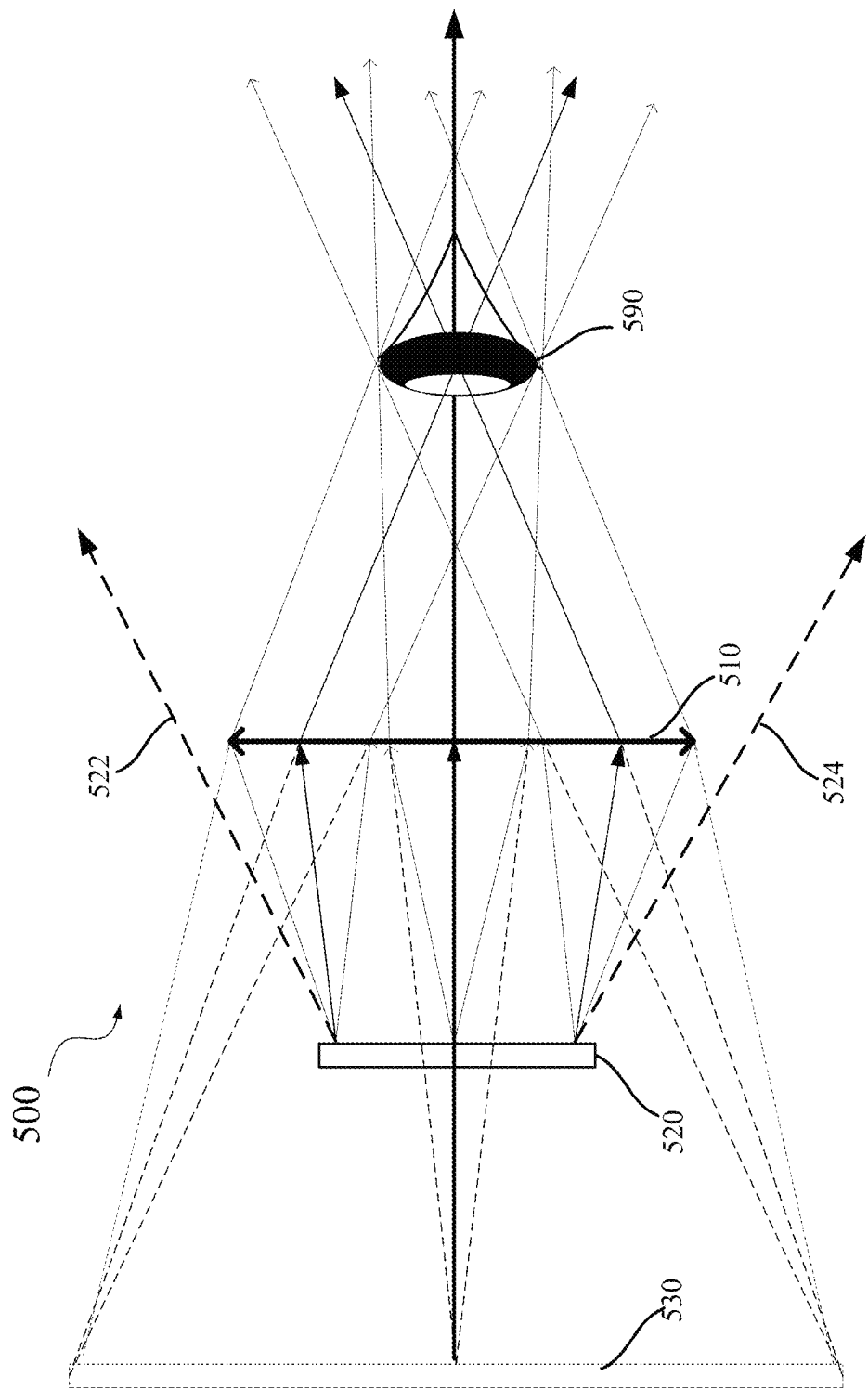
FIG. 5 illustrates an example of an optical system with a non-pupil forming configuration for a near-eye display device according to certain embodiments.

FIG. 5 illustrates an example of an optical system 500 with a non-pupil forming configuration for a near-eye display device according to certain embodiments. Optical system 500 may be an example of near-eye display 400, and may include display optics 510 and an image source 520 (e.g., a display panel). Display optics 510 may function as a magnifier. FIG. 5 shows that image source 520 is in front of display optics 510. In some other embodiments, image source 520 may be located outside of the field of view of the user's eye 590. For example, one or more deflectors or directional couplers may be used to deflect light from an image source to make the image source appear to be at the location of image source 520 shown in FIG. 5. Image source 520 may be an example of display 412 described above. For example, image source 520 may include a two-dimensional array of light emitters, such as semiconductor micro-LEDs or micro-OLEDs. The dimensions and pitches of the light emitters in image source 520 may be small. For example, each light emitter may have a diameter less than 2 µm (e.g., about 1.2 µm) and the pitch may be less than 2 µm (e.g., about 1.5 µm). As such, the number of light emitters in image source 520 can be equal to or greater than the number of pixels in a display image, such as 960×720, 1280×720, 1440×1080, 1920×1080, 2160×1080, or 2560×1080 pixels. Thus, a display image may be generated simultaneously by image source 520.

Light from an area (e.g., a pixel or a light emitter) of image source 520 may be directed to a user's eye 590 by display optics 510. Light directed by display optics 510 may form virtual images on an image plane 530. The location of image plane 530 may be determined based on the location of image source 520 and the focal length of display optics 510. A user's eye 590 may form a real image on the retina of user's eye 590 using light directed by display optics 510. In this way, objects at different spatial locations on image source 520 may appear to be objects on an image plane far away from user's eye 590 at different viewing angles. Image source 520 may have a size larger or smaller than the size (e.g., aperture) of display optics 510. Some light emitted from image source 520 with large emission angles (as shown by light rays 522 and 524) may not be collected and directed to user's eye 590 by display optics 510, and may become stray light.

Figure 6:
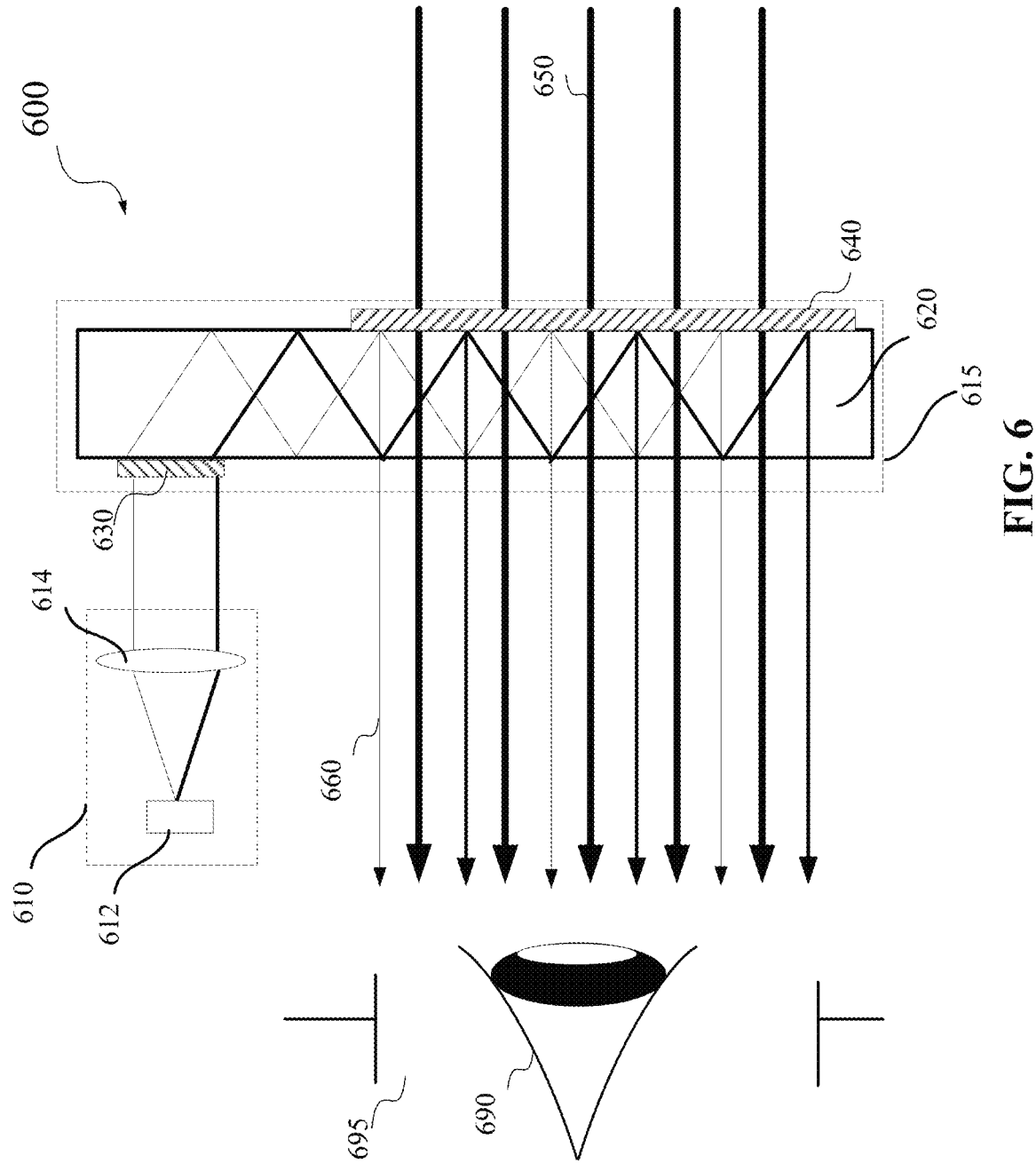
FIG. 6 illustrates an example of an optical see-through augmented reality system including a waveguide display according to certain embodiments.

FIG. 6 illustrates an example of an optical see-through augmented reality system 600 including a waveguide display according to certain embodiments. Augmented reality system 600 may be another example of near-eye display 400, and may include a projector 610 and a combiner 615. Projector 610 may include a light source or image source 612 and projector optics 614. In some embodiments, image source 612 may include a plurality of pixels that displays virtual objects, such as an LCD display panel or an LED display panel. For example, in some embodiments, light source or image source 612 may include one or more micro-LED devices, such as micro-OLED devices or semiconductor micro-LED devices. In some embodiments, image source 612 may include a plurality of light sources (e.g., a two-dimensional array of micro-LEDs), each emitting a monochromatic image light corresponding to a primary color (e.g., red, green, or blue). In some embodiments, image source 612 may include three two-dimensional arrays of micro-LEDs, where each two-dimensional array of micro-LEDs may include micro-LEDs configured to emit light of a primary color (e.g., red, green, or blue). In some embodiments, image source 612 may include a coherent or partially coherent light source (e.g., a laser) and an optical pattern generator, such as a spatial light modulator.

Projector optics 614 may include one or more optical components that can condition the light from image source 612, such as expanding, collimating, scanning, or projecting light from image source 612 to combiner 615. The one or more optical components may include, for example, one or more solid lenses, liquid lenses, mirrors, apertures, and/or gratings. In some embodiments, image source 612 may include one or more two-dimensional arrays of micro-LEDs, and projector optics 614 may include a lens assembly. In some embodiments, image source 612 may include one or more one-dimensional arrays or elongated two-dimensional arrays of micro-LEDs, and projector optics 614 may include one or more one-dimensional scanners (e.g., micro-mirrors or prisms) configured to scan light emitted by the one-dimensional arrays or elongated two-dimensional arrays of micro-LEDs to generate image frames. In some embodiments, projector optics 614 may include a liquid lens (e.g., a liquid crystal lens) with a plurality of electrodes that allows scanning of light from image source 612.

Combiner 615 may include an input coupler 630 for coupling light from projector 610 into a substrate 620 of combiner 615. Input coupler 630 may include, for example, a diffractive optical element (DOE) (e.g., a volume holographic grating, a surface-relief grating, a PBP grating, or a PVH grating), a slanted surface of substrate 620, or a refractive coupler (e.g., a wedge or a prism). For example, input coupler 630 may include a transmissive volume Bragg grating (e.g., on a surface of substrate 620 facing projector 610) or a reflective volume Bragg grating (e.g., on a surface of substrate 620 opposing projector 610). Input coupler 630 may have a coupling efficiency of greater than 30%, 50%, 75%, 90%, or higher for visible light. Light coupled into substrate 620 may propagate within substrate 620 through, for example, total internal reflection (TIR). In some embodiments, substrate 620 may be in the form of a lens of a pair of eyeglasses. Substrate 620 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 620 may be transparent to visible light.

Substrate 620 may include or may be coupled to a plurality of output couplers 640. Each output coupler 640 may be configured to extract at least a portion of the light guided by and propagating within substrate 620 out of substrate 620, and direct the extracted light 660 towards an eyebox 695 where an eye 690 of the user of augmented reality system 600 may be located when augmented reality system 600 is in use. The plurality of output couplers 640 may replicate the exit pupil to increase the size of eyebox 695 such that the displayed image may be visible in a larger area. As input coupler 630, output couplers 640 may include grating couplers (e.g., volume holographic gratings or surface-relief gratings), other diffraction optical elements (DOEs), prisms, partial reflectors (e.g., transflective mirrors), and the like. For example, output couplers 640 may include reflective volume Bragg gratings, transmissive volume Bragg gratings, or PVHs. Output couplers 640 may have different coupling (e.g., diffraction) efficiencies at different locations such that the intensities of the light beams coupled out of substrate 620 at different locations may be about the same. Substrate 620 and output couplers 640 may also allow light 650 from the environment in front of combiner 615 to pass through with little or no loss. For example, in some implementations, output couplers 640 may have a very low diffraction efficiency for light 650 such that light 650 may be refracted or otherwise pass through output couplers 640 with little loss, and may have a higher intensity than extracted light 660. As a result, the user may be able to view combined images of the environment in front of combiner 615 and images of virtual objects projected by projector 610.

In a real-world environment, a viewer may adjust the eyes' focal power to guarantee sharp retinal images (referred to as accommodation), and may adjust the angle between the eye's lines of sight (referred to as vergence) such that both eyes are directed to the same point. For example, to form a sharp image of an object on the retina, the eyed may accommodate to a distance close to the focal distance of the object. The acceptable range of the accommodated distance (i.e., the depth of focus) may be about ±0.3 diopters (D) under normal circumstances. For an object to be seen as a single (fused) object rather than double objects, the eyes' lines of sight need to converge at a distance close to the object distance. The tolerance range is the Panum's fusion area, which is about 15 to 30 arcmin. Vergence errors larger than about 15 to 30 arcmin may cause a breakdown in binocular fusion. To clearly view the object as a single object, the accommodation distance and the vergence distance need to be closely coupled.

Figure 7B:
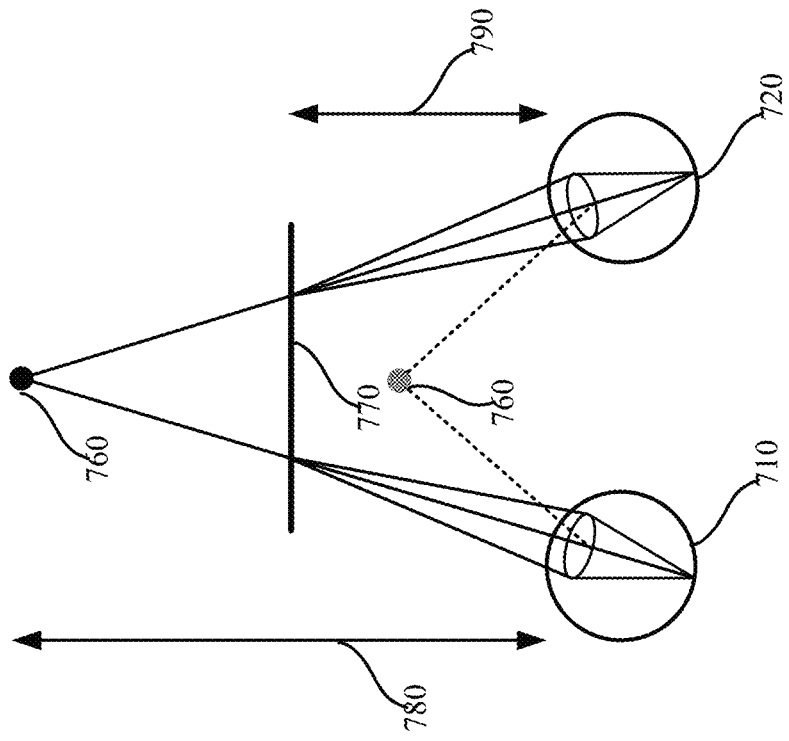
FIG. 7B illustrates the conflict between the focal distance and vergence distance in a near-eye display environment.
Figure 7A:
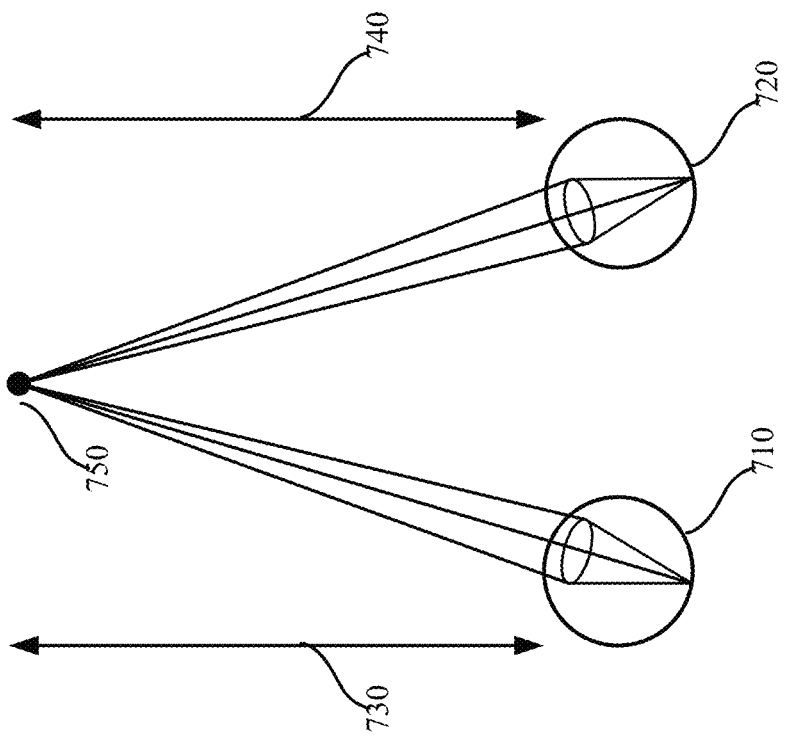
FIG. 7A illustrates the coupling between the focal distance and vergence distance in a real-world environment.

FIG. 7A illustrates the coupling between the focal distance and vergence distance in a real-world environment. In the real-world environment, the vergence and accommodation responses are neurally coupled or correlated. In general, the distance to which the eyes converge and the distance to which the eyes accommodate are the same no matter where the viewer looks. Accommodative changes would evoke vergence changes (referred to as accommodative vergence), and vergence changes would evoke accommodative changes (referred to as vergence accommodation). One benefit of the coupling is an increased speed of accommodation and vergence. As shown in FIG. 7A, when looking at a target point 750 in the real-world environment, the gaze directions of the left eye 710 and right eye 720 of the viewer, and thus the angle between the eye's lines of sight, can be naturally adjusted such that both eyes are directed to the same point. At the same time, the eyes' focal powers are also naturally adjusted to guarantee sharp retinal images (i.e., accommodation). Thus, the vergence distance 730 and focal distance 740 are the same.

In artificial reality displays (e.g., stereoscopic VR or AR displays), the coupling between the focal distance and the vergence distance may sometime be disrupted because the focal distance may be fixed at an image plane (e.g., a virtual image plane) while the vergence distance may vary depending on the virtual distance of a virtual object of the simulated scene the viewer fixates. Thus, a discrepancy between the two responses may occur because the eyes may need to converge on the virtual object (which may appear to be in front of or behind the image plane), and may also need to accommodate to the distance of the image plane. The disruption of the natural correlation between the vergence distance and the accommodation distance is often referred to as the vergence-accommodation conflict.

FIG. 7B illustrates the conflict between the focal distance and vergence distance in a near-eye display environment. When looking at a virtual object 760 that is intended to be at a vergence distance 780 in a simulated scene, the gaze directions of the left eye 710 and right eye 720 of the viewer, and thus the angle between the eye's lines of sight, need to be adjusted such that both eyes are directed to virtual object 760. On the other hand, because the virtual image is displayed on image plane 770, the eyes' focal power may need to be adjusted to focus on image plane 770. Thus, the focal distance 790 of the eye is the distance of image plane 770, which is often different from vergence distance 780. For example, in many existing near-eye displays, the image plane may be at a fixed distance (e.g., about 2 meters or about 3 meters) in front of the user's eyes. However, the intended distance of a displayed object in the simulated scene may vary and may be shorter or greater than 2 meters or 3 meters (e.g., between about 0.1 meters and infinity). Thus, the vergence distance may be shorter or greater than the focal distance.

The vergence-accommodation conflict has several adverse effects. For example, perceptual distortions may occur due to the conflicting disparity and focus information. It may be difficult to simultaneously fuse and focus a stimulus (e.g., an intended object) because the viewer needs to adjust vergence and accommodation to different distances. If the accommodation is accurate, the viewer may see the object clearly, but may see double images. If the vergence is accurate, the viewer may see one fused object, but it may be blurred. Visual discomfort may occur as the user attempts to adjust both the vergence and the accommodation. The set of vergence and accommodative responses that may not cause eye discomfort is the Percival's zone of comfort, which is about one-third of the width of the zone of clear single binocular vision. Stimuli (e.g., target objects) in the real world fall within the comfort zone, while many stimuli in 3D displays do not. To fuse and focus the stimuli in 3D displays, the viewer may need to counteract the normal accommodation—vergence coupling, and the effort involved is believed to cause viewer fatigue and discomfort during a prolonged use of near-eye displays.

To reduce the ocular stress, a near-eye display device may need to be able to display images on multiple image planes. The distance of the image plane may need to be changeable based on the vergence distance of the content displayed. For content having a longer vergence distance, the image plane may need to be at a longer distance from the user's eye. For example, the image plane may be set at 0.6 meters in front of the user's eyes when the vergence distance is less than about 1 meter, and the image plane may be set at 2 meters in front of the user's eyes when the vergence distance is greater than about 1 meter. In this way, the vergence distance and the focal distance may be coupled or correlated to reduce the vergence-accommodation conflict and thus the eye stress. To have even better correspondence between the vergence and accommodation, three or more image planes may be needed.

In some embodiments, a lens stack (e.g., a liquid crystal lens stack) may be used to form a switchable lens assembly that can adaptively project images at two or more image planes. The lens stack may include one or more liquid crystal lenses or other lenses sensitive to either linearly or circularly polarized light, which may have different optical power for incident light of different polarization states. The lens stack may also include one or more switchable polarization converters (e.g., switchable waveplates) that may be switched on or off to change the polarization state of the light incident on the polarization sensitive lenses (e.g., rotating the linear polarization direction or changing the handedness of circular polarization), thereby changing the optical power of the polarization sensitive lenses and the lens stack to change the distance of the image plane. These switchable polarization converters may be placed in front of the lens stack or between the lenses.

In some near-eye display systems, polarization sensitive lenses, such as PBP lenses, may be used to project the displayed images to user's eyes. The polarization sensitive lens may diffract light of a first polarization state (e.g., RHCP or LHCP) by a certain diffraction angle and at a certain diffraction efficiency into a first (e.g., +1) diffraction order, and may diffract light of a second polarization state (e.g., LHCP or RHCP) by a different diffraction angle and at a certain diffraction efficiency into another (e.g., −1) diffraction order. Thus, the polarization sensitive lens may have different optical powers for light of different polarization states, and may, for example, collimate or focus light in a first circular polarization state while diverging light in a second circular polarization state. The polarization sensitive lens can be made using birefringent materials such as liquid crystal (LC) polymer layers, and can be made flat. The polarization sensitive lenses may be fabricated, for example, by coating liquid crystal polymer materials on an alignment layer with alignment patterns formed thereon. The alignment patterns may include alignment patterns for a lens, and may be formed by, for example, polarization interference patterning, direct laser writing patterning, or imprint lithography. The liquid crystal polymer materials may be coated on the patterned surface of the alignment layer, for example, layer by layer, until a desired thickness and/or twist angle is reached. A curing (e.g., UV or thermal curing) process may be performed to cure the liquid crystal polymer materials and fix the twist pattern of the liquid crystal molecules.

The diffraction efficiency of a PBP lens for surface-normal incident light (e.g., light propagating in the z direction) may be approximately determined by:

$$\eta_0 = \cos^2\left(\frac{\pi \Delta n d}{\lambda}\right), \text{ and}$$

$$\eta_{\pm 1} = \frac{1 \mp S_3'}{2} \sin^2\left(\frac{\pi \Delta n d}{\lambda}\right),$$

where $\eta_m$ is the diffraction efficiency of the mth diffraction order, $\Delta n$ is the birefringence of the liquid crystal layer, d is the thickness of the liquid crystal layer, $\lambda$ is the wavelength of the incident light, and $S_3'=S_3/S_0$ is the normalized Stokes parameter corresponding to the ellipticity of the polarization of the incident light. As indicated by the above equations, if the thickness $d=\lambda/(2\Delta n)$ (i.e., a half-wave retardation by the liquid crystal layer), the zeroth order transmission $\eta_0$ may be zero, and all incident light may be diffracted to the $\pm 1$ diffraction orders. The zeroth diffraction order may be polarization independent, while the $\pm 1$ diffraction orders may be sensitive to $S_3'$. For example, when the liquid crystal layer thickness $d=\lambda/2\Delta n$ and the incident light has a right-handed circular polarization ($S_3'=+1$), $\eta_{+1}=0$ and $\eta_{-1}=1$, which indicates that all incident light passing through the PBP lens may be diffracted into the −1 diffraction order. When the liquid crystal layer thickness $d=\lambda/2\Delta n$ and the incident light has a left-handed circular polarization ($S_3'=-1$), $\eta_{+1}=1$ and $\eta_{-1}=0$, which indicates that all incident light is diffracted into the +1 diffraction order. Although m=+1 diffraction order is herein considered as the primary order and the m=−1 diffraction order is considered the conjugate order, the designation of the orders may be reversed or otherwise changed. In general, only the zeroth and the two first diffracted orders may be possible, regardless of the grating period A and the thickness d.

Moreover, after passing through the PBP lens, the circularly polarized light may be changed to light of the opposite circular polarization state, because the light may experience a relative phase shift about a half wavelength in the liquid crystal layer. For example, after the right-handed circularly polarized light ($S_3=1$) passes through the PBP lens, the polarization state of the light (e.g., in the −1 diffraction order) may be changed to the left-handed circular polarization ($S_3=-1$). After the left-handed circularly polarized light ($S_3=-1$) passes through the PBP lens, the polarization state of the light (e.g., in the +1 diffraction order) may be changed to the right-handed circular polarization ($S_3=1$).

Figure 8A:
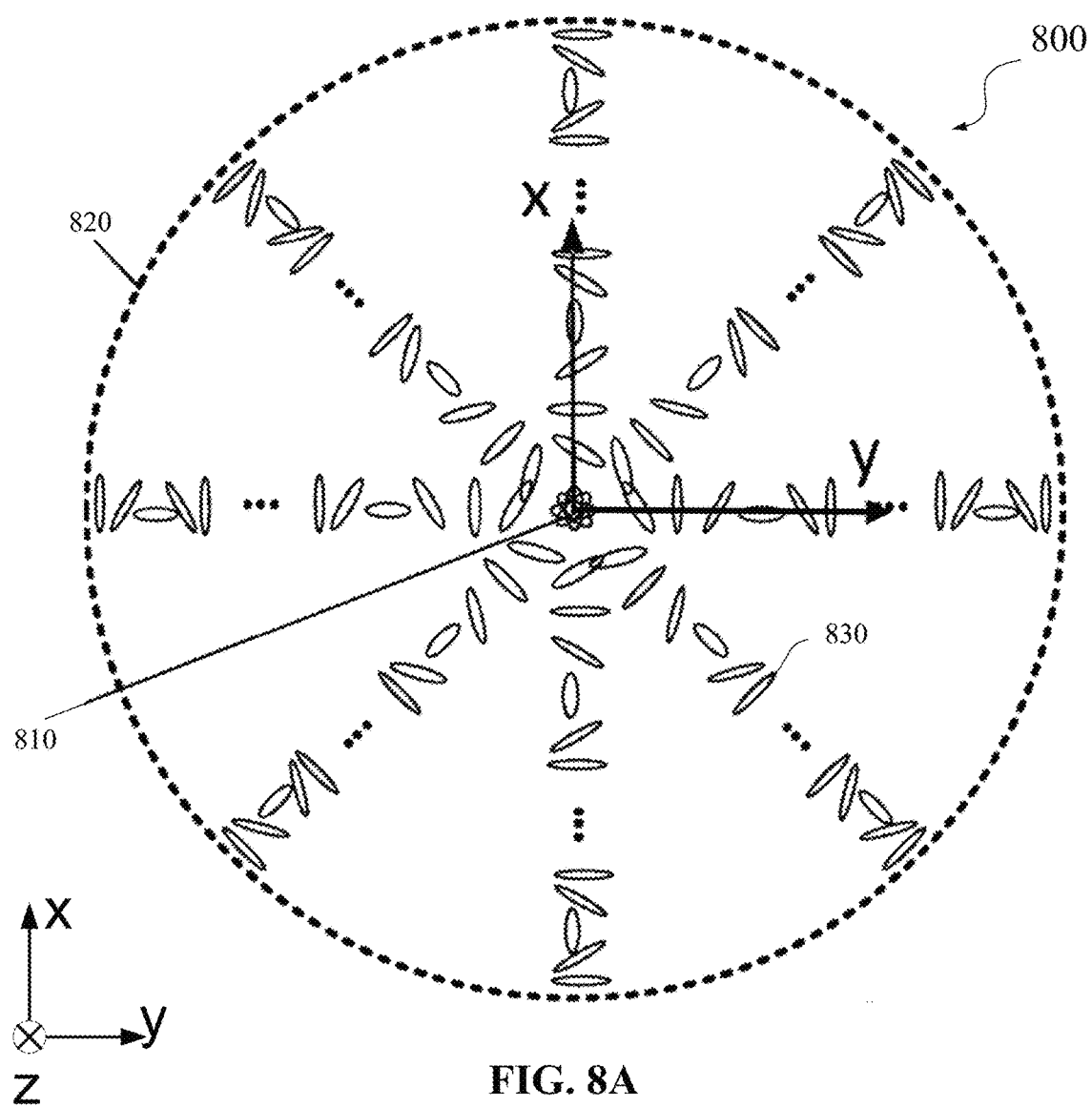
FIG. 8A illustrates LC molecule orientations in an example of a Pancharatnam Berry Phase (PBP) lens according to certain embodiments.
Figure 8B:
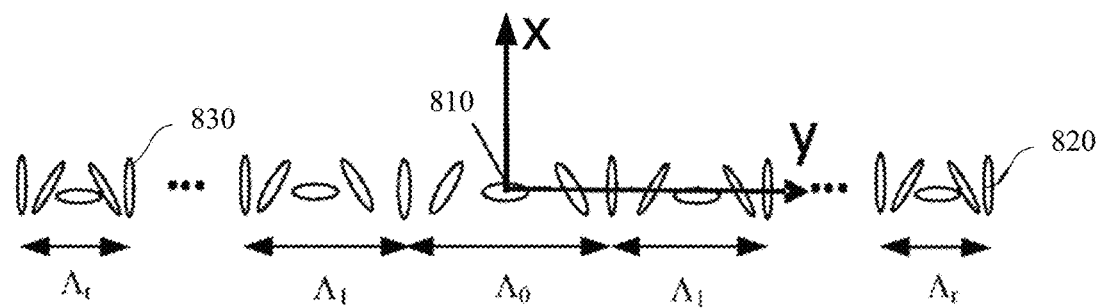
FIG. 8B illustrates the LC molecule orientations of a portion of the PBP lens of FIG. 8A according to certain embodiments.

FIG. 8A illustrates LC molecule orientations in an example of a PBP lens 800 according to certain embodiments. FIG. 8B illustrates the LC molecule orientations of a portion of PBP lens 800 according to certain embodiments. PBP lens 800 may focus or diverge light due to the gradient of geometric phase within the lens. As shown in FIG. 8A, PBP lens 800 may have a phase profile of a lens created by LC molecules 830 with different in-plane orientations, where the phase delay $\varphi(r)$ at a location may be a function of the azimuth angle $\psi(r)$ of the optical axis (e.g., orientations of LC molecules 830) at the location: $\varphi(r)=\pm 2\psi(r)$. The azimuth angles $\psi(r)$ of LC molecules 830 may be continuously changed from a center 810 to an edge 820 of PBP lens 800. The pitch $\Lambda$ of the rotational pattern of liquid crystal molecules 830 within which the azimuth angles of LC molecules 830 are rotated by 180° may vary from center 810 to edge 820 of PBP lens 800 to vary the diffraction angle. Accordingly, PBP lens 800 can have a large aperture size and can be made with a thin LC layer to cause a half-wave retardation. PBP lens 800 may have a twisted or non-twisted structure along the z-axis. A dual twist or multiple twisted structure along the z-axis may offer achromatic performance in PBP lens 800. A non-twisted structure along the z-axis may be easier to fabricate than a twisted structure, but may not offer achromatic performance.

The portion of PBP lens 800 shown in FIG. 8B may be taken along a radial direction, such as along the y-axis. As shown in FIG. 8B, the pitch A of the rotational pattern of liquid crystal molecules 830 may be a function of the distance from center 810 and may progressively decrease as the distance from center 810 increases. For example, the pitch $\Lambda_0$ at center 810 may be the longest, the pitch Ar at edge 820 may be the shortest, and the pitch $\Lambda_n$ between center 810 and edge 820 may be between pitch $\Lambda_0$ and pitch $\Lambda_r$. Therefore, light incident on the center region of PBP lens 800 may be diffracted by a smaller diffraction angle due to a longer pitch, while light incident on the edge region of PBP lens 800 may be diffracted by a larger diffraction angle due to a shorter pitch.

The Jones vectors of LHCP light and RHCP light can be described as:

$$J_\pm = \frac{1}{\sqrt{2}}\begin{bmatrix} 1 \\ \pm j \end{bmatrix},$$

where $J_+$ and $J_-$ represent the Jones vectors of LHCP light and RHCP light, respectively. For a PBP lens with focal length f, the local azimuth angle $\psi(r)$ in an x-y plane may vary according to:

$$\pm 2\psi(r) = \varphi(r) = -\frac{\omega}{c}\left(\sqrt{r^2 + f^2} - f\right)$$

in order to achieve a centrosymmetric parabolic phase distribution, where $\varphi$, $\omega$, c, and r are the relative phase, angular frequency, speed of light in vacuum, and radial coordinate of the lens, respectively. After passing through the PBP lens, the Jones vectors may be changed to:

$$J'_\pm = R(-\psi)W(\pi)R(\psi)J_\pm = \begin{bmatrix} \cos\psi & -\sin\psi \\ \sin\psi & \cos\psi \end{bmatrix}\begin{bmatrix} e^{-j\frac{\pi}{2}} & 0 \\ 0 & e^{-j\frac{\pi}{2}} \end{bmatrix}\begin{bmatrix} \cos\psi & \sin\psi \\ -\sin\psi & \cos\psi \end{bmatrix}$$

-continued $$\frac{1}{\sqrt{2}}\begin{bmatrix}1\\\pm j\end{bmatrix} = \frac{-je^{\pm 2j\psi}}{\sqrt{2}}\begin{bmatrix}1\\\mp j\end{bmatrix} = -je^{\pm 2j\psi}J\mp,$$

where $R(\psi)$ and $W(\pi)$ are the rotation matrix and the retardation Jones matrix, respectively. As can be seen from the equation above, the handedness of the output light is switched relative to the incident light. In addition, a spatial-varying phase depending on the local azimuth angle $\psi(r)$ is accumulated. Furthermore, the phase accumulation has opposite signs for RHCP light and LHCP light, and thus the PBP lens may modify the wavefront of RHCP and LHCP incident light differently. For example, a PBP lens may have a positive optical power for RHCP light and a negative optical power for LHCP light, or vice versa.

Figures 9A, 9B:
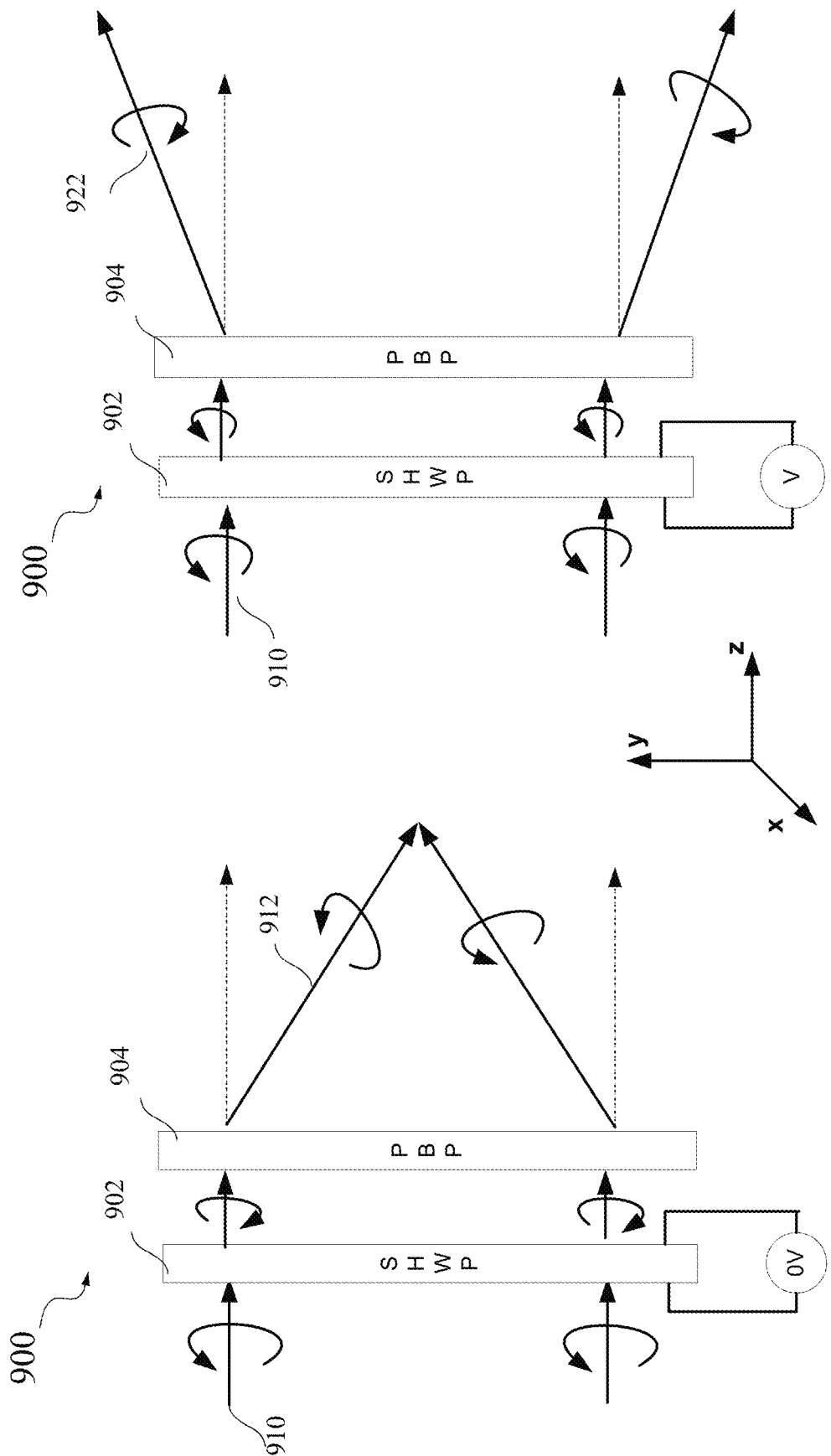
FIGS. 9A and 9B illustrate an example of a device including a switchable half-wave plate and a PBP lens according to certain embodiments.

FIGS. 9A and 9B illustrate an example of a device 900 including a switchable half-wave plate (SHWP) 902 and a PBP lens 904 that is sensitive to circularly polarized light according to certain embodiments. SHWP 902 may convert LHCP light to RHCP light (or convert RHCP light to LHCP light), when no voltage signal is applied to it (the OFF state) as shown in FIG. 9A. When a voltage signal is applied to SHWP 902 (the ON state) as shown in FIG. 9B, SHWP 902 may pass RHCP light and LHCP light without changing the handedness of the incident light. PBP lens 904 may be an example of PBP lens 800. The thickness d of PBP lens 904 may be selected to achieve a half-wave retardation according to d=k/(24n) as described above. PBP lens 904 can be a passive or active lens, and can have a positive or negative optical power for RHCP or LHCP light in various embodiments. In the illustrated example, PBP lens 904 may have a positive optical power for RHCP light and thus may focus collimated RHCP light as shown in FIG. 9A, and may have a negative optical power for LHCP light as shown in FIG. 9B.

In the example shown in FIGS. 9A and 9B, the input light 910 to device 900 may be LHCP light. As shown in FIG. 9A, when no voltage signal is applied to SHWP 902, light passing through SHWP 902 and incident on PBP lens 904 may be RHCP light, and thus may be focused by PBP lens 904 that may have a positive optical power for RHCP light. As described above, the output light 912 may become LHCP light. As shown in FIG. 9B, when a voltage signal is applied to SHWP 902, light passing through SHWP 902 and incident on PBP lens 904 may be LHCP light, and thus may be diverged by PBP lens 904 that may have a negative optical power for LHCP light. The output light 922 may become RHCP light. When the half-wave retardation is not achieved in SHWP 902 (e.g., in the OFF state) or PBP lens 904, some input light may not be converted to the orthogonal polarization state and may not be diffracted, as shown by the dashed lines in FIG. 9A. Similarly, when zero retardation is not achieved in SHWP 902 (e.g., in the ON state), some input light may not maintain its polarization state after passing through SHWP 902, and thus may not be diffracted, as shown by the dashed lines in FIG. 9B.

In some embodiments, two or more polarization sensitive lenses may be used in an adaptive lens to achieve a switchable focal length. For example, two or more passive PBP lenses as described above may be used with a switchable polarization converter (e.g., a switchable half-wave plate) to achieve different focal lengths. Because the PBP lenses have different signs of optical power for circularly polarized light of different handedness, the overall optical power of the adaptive lens may be switched by switching on or off the switchable half-wave plate.

Figure 10A:
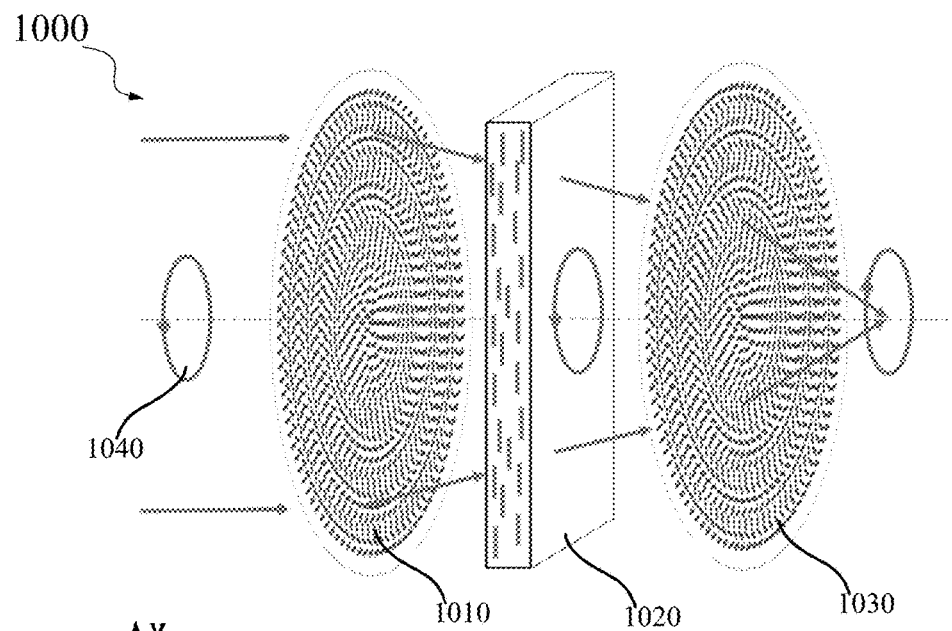
FIGS. 10A and 10B illustrate an example of a liquid crystal device having a variable focal length according to certain embodiments.
Figure 10B:
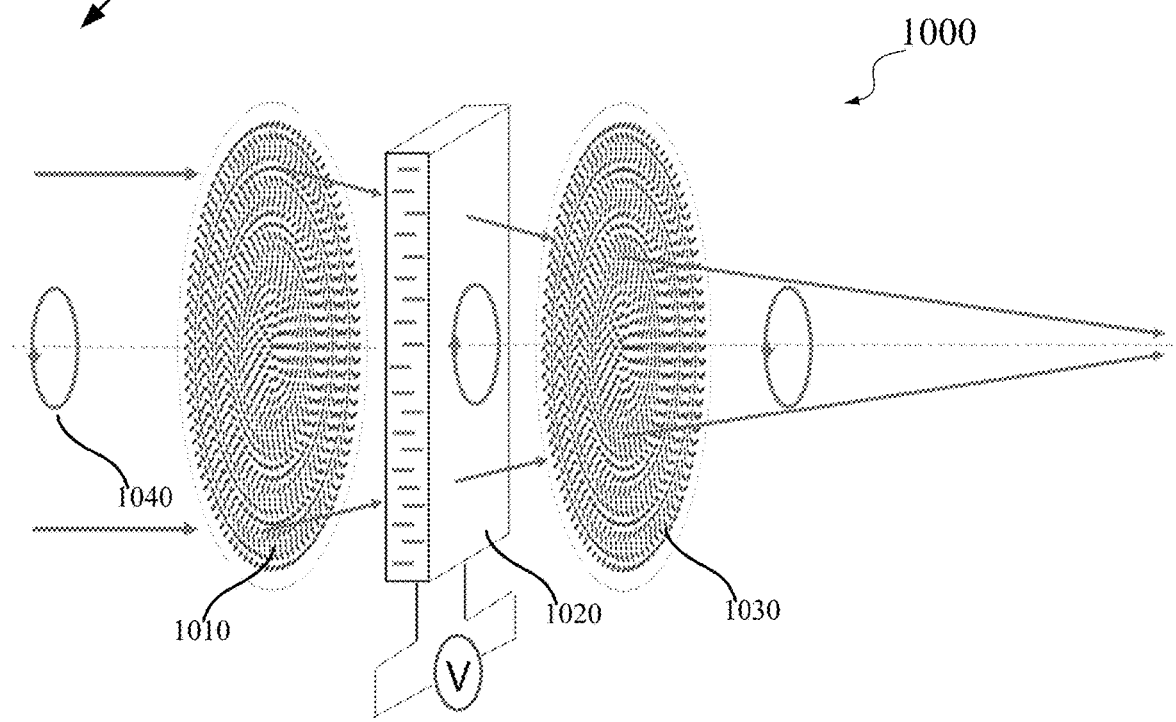

FIGS. 10A and 10B illustrate an example of a liquid crystal device 1000 having a variable focal length according to certain embodiments. Liquid crystal device 1000 may include a first PBP lens 1010, a switchable half-wave plate 1020, and a second PBP lens 1030. First PBP lens 1010 and second PBP lens 1030 can be passive or active lenses, and can have a positive or negative optical power for RHCP or LHCP light in various embodiments. In one example, first PBP lens 1010 and second PBP lens 1030 may both have a positive optical power for RHCP light and a negative optical power for LHCP light. In another example, first PBP lens 1010 and second PBP lens 1030 may both have a negative optical power for RHCP light and a positive optical power for LHCP light. In yet another example, first PBP lens 1010 may have a positive optical power for RHCP light, while second PBP lens 1030 may have a negative optical power for RHCP light. Switchable half-wave plate 1020 may be a liquid crystal polarization converter that can be switched on or off by a voltage signal. For example, when no voltage signal is applied to switchable half-wave plate 1020, switchable half-wave plate 1020 may be in the "OFF" state, and may have a half-wavelength retardation and thus may change the handedness of circularly polarized light passing through it. When a voltage signal is applied to switchable half-wave plate 1020, switchable half-wave plate 1020 may be in the "ON" state, and may have a zero phase retardation and thus may not change the handedness of circularly polarized light passing through it.

In the example shown in FIG. 10A, an RHCP light beam 1040 is incident on liquid crystal device 1000, where no voltage signal is applied to switchable half-wave plate 1020 (i.e., switchable half-wave plate 1020 is in the "OFF" state). First PBP lens 1010 may have an optical power D1 for RHCP light, and second PBP lens 1030 may have an optical power D2 for RHCP light. RHCP light beam 1040 may enter first PBP lens 1010 and may be changed to LHCP light by first PBP lens 1010. The LHCP light may then be changed back to RHCP light after passing through switchable half-wave plate 1020. The RHCP light may be incident on second PBP lens 1030. Therefore, the incident light (RHCP light beam 1040) may be incident on both first PBP lens 1010 and second PBP lens 1030 as RHCP light, and thus the total optical power of liquid crystal device 1000 may be about D1+D2.

In the example shown in FIG. 10B, RHCP light beam 1040 is incident on liquid crystal device 1000, where a voltage signal 1050 is applied to switchable half-wave plate 1020 (i.e., switchable half-wave plate 1020 is in the "ON" state) to turn off switchable half-wave plate 1020 (no polarization state change). RHCP light beam 1040 may enter first PBP lens 1010 and may be changed to LHCP light by first PBP lens 1010. The LHCP light may remain left-handed circularly polarized after passing through switchable half-wave plate 1020 that has been turned off. The LHCP light may be incident on second PBP lens 1030 that has an optical power −D2 for LHCP light. Therefore, the total optical power of liquid crystal device 1000 for RHCP light beam 1040 may be about D1−D2.

Thus, by switching switchable half-wave plate 1020 on or off, the optical power of liquid crystal device 1000 may be switched between D1+D2 and D1−D2. In some embodiments, three or more passive PBP lenses and two or more switchable half-wave plates 1020 may be used in a liquid crystal device to achieve three or more different optical power values and thus three or more different image planes.

FIGS. 11A-11B illustrate an example of a switchable waveplate 1100. FIG. 11A shows an example of a layer stack-up of switchable waveplate 1100. In the illustrated example, switchable waveplate 1100 may include a first substrate 1110 (e.g., a glass substrate), a first electrode layer 1120 (e.g., including a transparent conductive oxide, such as indium tin oxide (ITO)), an alignment layer 1130, a liquid crystal layer 1140, a second electrode layer 1150 (e.g., including a transparent conductive oxide, such as ITO), and a second substrate 1160. Liquid crystal layer 1140 may include, for example, twisted nematic (TN) liquid crystal structures formed in a liquid crystal polymer layer that includes liquid crystal molecules and chiral dopants. Liquid crystal molecules in liquid crystal layer 1140 may be oriented according to the alignment pattern in alignment layer 1130.

FIG. 11B shows an example of alignment layer 1130 that includes a uniform alignment pattern for aligning the liquid crystal molecules in liquid crystal layer 1140. The azimuthal orientation of liquid crystal molecules adjacent to alignment layer 1130 may be shown by the uniform alignment pattern in alignment layer 1130, and the azimuthal orientation of liquid crystal molecules in liquid crystal layer 1140 may change (twist) as the distance of the liquid crystal molecules from alignment layer 1130 increases, for example, due to the addition of chiral dopants in liquid crystal layer 1140.

In this way, the liquid crystal molecules in liquid crystal layer 1140 may be oriented such that liquid crystal layer 1140 may have different refractive indices for surface-normal incident light of orthogonal polarization states. Therefore, liquid crystal layer 1140 may provide a certain retardance between surface-normal incident light of two orthogonal polarization states, such as a quarter wavelength or a half wavelength retardance, when no electric field is applied to liquid crystal layer 1140.

First electrode layer 1120 and second electrode layer 1150 may be used to apply an electric field to liquid crystal layer 1140. When an electric field is applied to liquid crystal layer 1140, the liquid crystal molecules in liquid crystal layer 1140 may be reoriented by the electric field to substantially align with the electric field, such that liquid crystal layer 1140 may have the same refractive index for surface-normal incident light of orthogonal polarization states, and thus liquid crystal layer 1140 may provide zero retardance between surface-normal incident light of two orthogonal polarization states.

FIGS. 11C-11D illustrate an example of an achromatic switchable waveplate 1102 including double twisted nematic liquid crystal layers. FIG. 11C shows an example of the layer stack of achromatic switchable waveplate 1102. In the illustrated example, achromatic switchable waveplate 1102 includes a first substrate 1112, a first electrode layer 1122 (e.g., including ITO), an alignment layer 1132, a first liquid crystal layer 1142, a second liquid crystal layer 1144, a second electrode layer 1152 (e.g., including ITO), and a second substrate 1162. In some embodiments, another alignment layer may be between second liquid crystal layer 1144 and second electrode layer 1152.

Each of liquid crystal layers 1142 and 1144 may include, for example, TN liquid crystal structures formed in a liquid crystal polymer layer that includes liquid crystal molecules and chiral dopants. As described above, liquid crystal molecules in liquid crystal layers 1142 and 1144 may be oriented according to the alignment patterns in the alignment layer(s). FIG. 11D shows an example of an alignment layer 1132 that includes a uniform alignment pattern for aligning the liquid crystal molecules in liquid crystal layer 1142. The azimuthal orientation of liquid crystal molecules adjacent to alignment layer 1132 may be shown by the uniform alignment pattern in alignment layer 1132, and the azimuthal orientation of liquid crystal molecules in liquid crystal layer 1142 may change (twist) as the distance of the liquid crystal molecules from alignment layer 1132 increases, due to, for example, the addition of chiral dopants in liquid crystal layer 1142. FIG. 11D also shows the liquid crystal molecule twist angle Φ of each liquid crystal layer 1142 or 1144. In the example shown in FIGS. 11C and 11D, liquid crystal layers 1142 and 1144 may be two antisymmetric liquid crystal layers with opposite twist angles, such as +70° and −70°, to provide achromatic retardance.

As described above, PBP lenses and switchable waveplates may be fabricated by coating liquid crystal polymer materials on an alignment layer with alignment patterns formed thereon. The alignment patterns may be formed by, for example, photoalignment, direct laser writing patterning, nanoimprint techniques, and the like. The liquid crystal polymer materials may be coated on the patterned surface of the alignment layer, for example, layer by layer, until a desired thickness is reached. A curing (e.g., UV or thermal curing) process may be performed to cure the liquid crystal polymer layers and fix the twist pattern of the liquid crystal molecules.

In one example, a photoalignment material (e.g., including a photocurable monomer material) may be coated on the surface of a substrate using, for example, spin coating or spray coating, to form a photoalignment material layer. The photoalignment material may include, for example, brilliant yellow (BY) dissolved in dimethylformamide (DMF). After the coating, the photoalignment material layer may be dried by, for example, baking at an elevated temperature (e.g., greater than about 100° C.) to remove the solvent. The photoalignment material layer may have a thickness about, for example, 10 nm to 50 nm. In one example, the photoalignment material layer may be exposed to an interference pattern to form an alignment layer on the substrate. The exposure of the photoalignment material layer to the interference pattern may cause the polymerization of the photocurable monomers of the photoalignment material at the bright regions of the interference pattern to form polymerized chains. Thus, the orientation of the alignment pattern in the alignment layer may vary across the alignment layer according to the interference pattern.

A layer of a birefringent material may be deposited on the alignment layer, for example, by spin coating or spray coating. The birefringent material may include optically anisotropic molecules (e.g., liquid crystal molecules) and a curable stabilizing material (e.g., photocurable monomers or polymers). For example, the birefringent material may include liquid crystal molecules mixed with photocurable monomers or polymers to form polymerizable liquid crystal reactive mesogens (RMs), such as polymer-stabilized nematic liquid crystals or polymer-dispersed nematic liquid crystals. The birefringent material may have a birefringence greater than about 0.1, greater than about 0.15, greater than about 0.2, or larger. In some embodiments, the birefringent material may also include a photo-initiator, a chiral dopant, and/or a dichroic dye. The optically anisotropic molecules in the layer of the birefringent material deposited on the alignment layer may align with the alignment pattern in the alignment layer. In some embodiments, the optically anisotropic molecules in the layer of the birefringent material may form helical structures. The layer of the birefringent material may be cured to fix the curable stabilizing material, which may stabilize the liquid crystal molecules in the layer of the birefringent material. In one example, the curing may be performed by exposing the layer of the birefringent material using an ultraviolet (UV) light beam to polymerize the photocurable monomers or cross-link the polymers to form crosslinked polymers. The layer of the birefringent material with the optically anisotropic molecules stabilized or fixed by the crosslinked polymers may form a polarization sensitive lens. In some embodiments, multiple liquid crystal reactive mesogen layers may be coated layer by layer on the alignment layer, until a desired thickness (e.g., to achieve a half-wave retardation for high efficiency) is reached. The multiple liquid crystal reactive mesogen layers may be cured together or layer by layer using UV light beam.

PBP lenses and switchable waveplates generally have uniform designs that are optimized for incident light with small incident angles (e.g., surface-normal incident light or paraxial light) across the apertures of the switchable waveplates. Due to limitations of the structures and material properties (e.g., alignment pattern, tilt angle, twist angle, birefringence, and electric field applied), PBP lenses and switchable waveplates made of liquid crystals may have limited angular bandwidth, and may have lower performance (e.g., low diffraction efficiency, high polarization leakage, etc.) for incident light with large incident angles (e.g., light from a large field of view).

Figure 12:
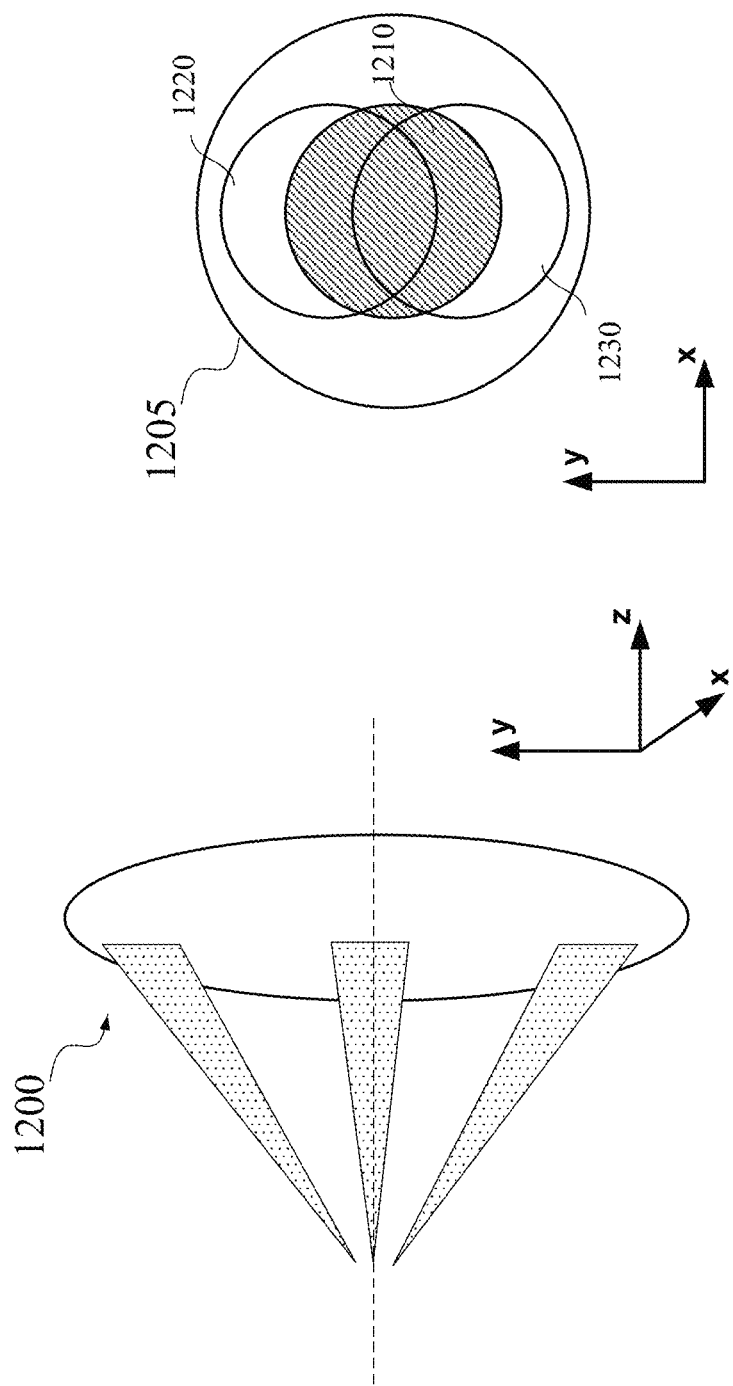
FIG. 12 illustrates light incident on an optical element from different fields of view (or incident angles).

FIG. 12 illustrates light incident on an optical element 1200 (e.g., a PBP lens or a waveplate) from different fields of view (or incident angles). Optical element 1200 may have a uniform liquid crystal structures designed to achieve high performance for paraxial light (or light with small incident angles). Optical element 1200 may have a limited angular bandwidth, due to limitations of the structures and material properties. The field of view of optical element 1200 may be shown by a circle 1205 in a polar plot in FIG. 12, while the angular bandwidth of optical element 1200 may be indicated by a circle 1210. Optical element 1200 may have higher performance (e.g., higher diffraction efficiency or low polarization leakage) for incident light with incident angles within circle 1210, but may have low performance for incident light with incident angles outside of circle 1210.

As illustrated in FIG. 12, light from an image source may be incident on different positions of the viewing aperture of optical element 1200 at different angles. Thus, the angles of interest (AOIs) at different positions of the viewing aperture of optical element 1200 may be different. For example, at a center region of optical element 1200, the AOIs may be small (e.g., within circle 1210), and thus the center region of optical element 1200 may have high performance for its AOIs. However, at off-centered regions, the AOIs may be large and may not be within the angular bandwidth of optical element 1200. For example, a circle 1220 in FIG. 12 shows the AOIs at a lower region of optical element 1200, where circle 1220 may have a portion outside of the angular bandwidth of optical element 1200 indicated by circle 1210. Similarly, a circle 1230 in FIG. 12 shows the AOIs at an upper region of optical element 1200, where circle 1230 may have a portion outside of the angular bandwidth of optical element 1200 indicated by circle 1210. Since optical element 1200 may have the same limited angular bandwidth (shown by circle 1210) at all regions due to the uniform liquid crystal structure, optical element 1200 may have a low performance for incident light with large incident angles (e.g., outside the angular bandwidth indicated by circle 1210). Therefore, the off-centered regions of optical element 1200 may not have high performance for the respective AOIs at the off-centered regions.

Figure 13:
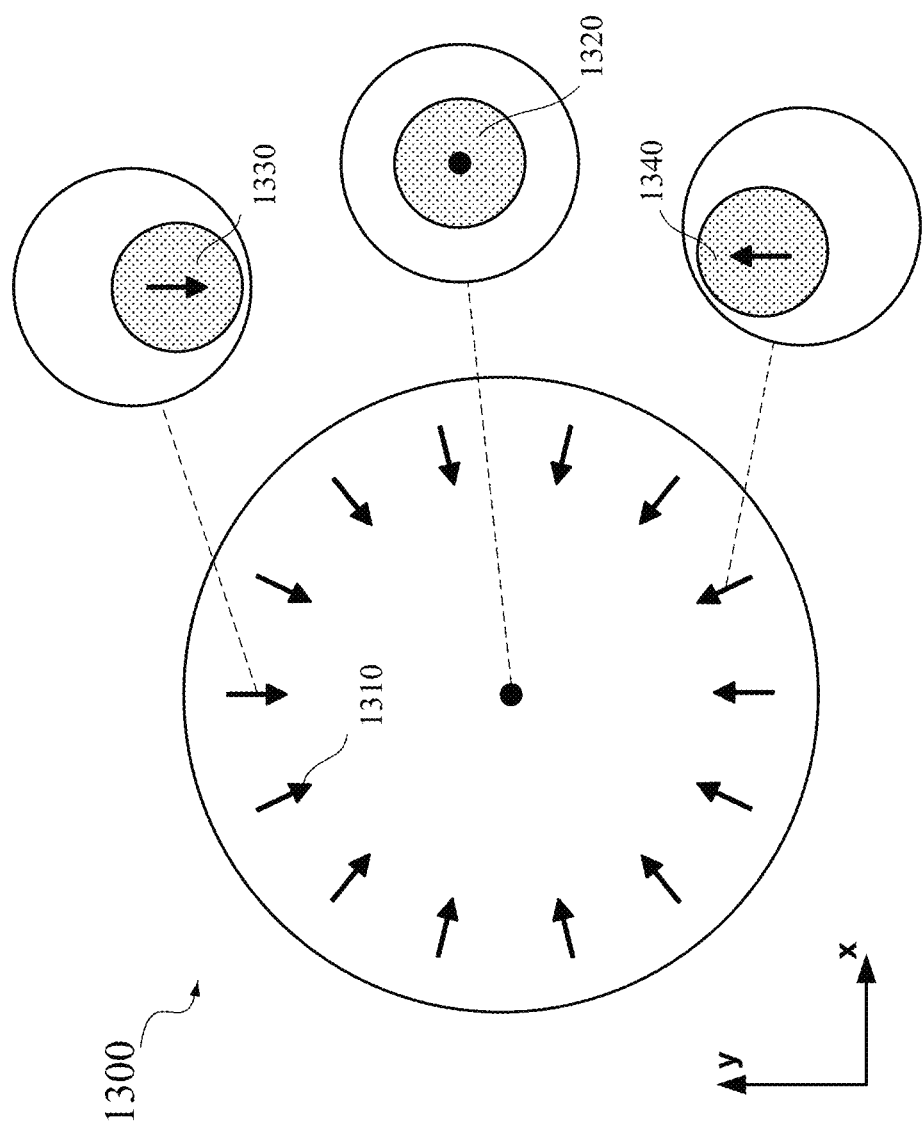
FIG. 13 illustrates the angles of interest (e.g., view angles) at different regions of an example of an optical element.

FIG. 13 illustrates the angles of interest (e.g., view angles) at different regions of an example of an optical element 1300. Arrows 1310 in FIG. 13 illustrate the viewing angle directions (angles of interest) of the chief rays at different locations of the viewing aperture of optical element 1300. A circle 1320 in a polar plot shows the AOIs in a center region of the viewing aperture of optical element 1300, a circle 1330 in a polar plot shows the AOIs in an upper region of the viewing aperture of optical element 1300, and a circle 1340 in a polar plot shows the AOIs in a lower region of the viewing aperture of optical element 1300. FIG. 13 shows that the AOIs at different locations of optical element 1300 may be different. Therefore, optical element 1300 may need to have different angular bandwidths at different regions in order to optimize the performance at different locations of optical element 1300 for incident light within the respective AOIs.

The phase delay of an incident light beam by a PBP lens or a switchable waveplate may depend on the incident angle of the incident light beam. For example, a PBP lens or a waveplate that may provide a half-wave retardance for paraxial light may provide a different birefringence for off-axis light. The birefringence may depend on the incident angle, and may change the phase retardance for off-axis incident light, and thus may detrimentally affect the performance of a PBP lens or waveplate that is designed to maximize paraxial incident light, in particular, for light with large incident angles or from wider fields of view. For example, the efficiency of a PBP lens or the retardance of a waveplate may be low at a larger viewing aperture (e.g., the peripheral regions), which may lead to leakage light, brightness and resolution drop, and/or ghost images.

Figure 14B:
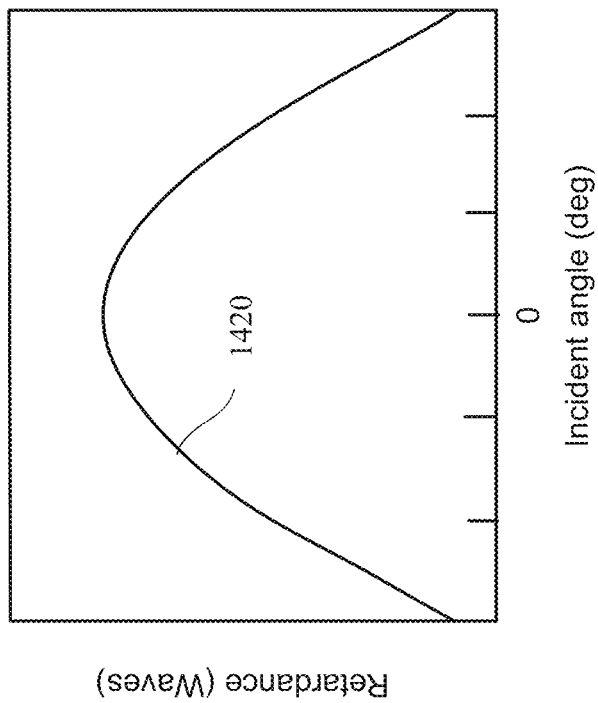
FIG. 14B includes a curve illustrating an example of the retardance of a switchable waveplate including uniform liquid crystal structures as a function of the incident angle (e.g., the zenith angle) of the incident light.
Figure 14A:
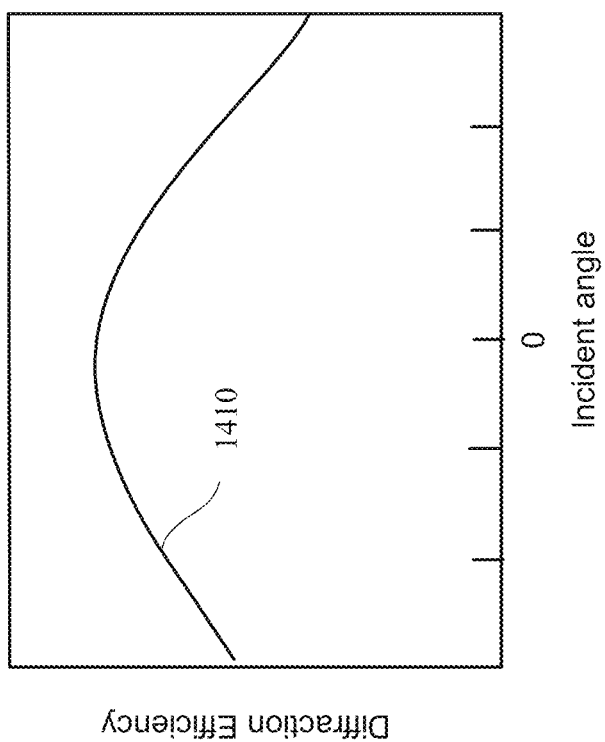
FIG. 14A includes a curve illustrating an example of the diffraction efficiency of a PBP lens including liquid crystals with uniform liquid crystal structures as a function of the incident angle (e.g., zenith angle) of the incident light.

FIG. 14A includes a curve 1410 illustrating an example of the diffraction efficiency of a PBP lens including liquid crystals with uniform liquid crystal structures as a function of the incident angle (e.g., zenith angle) of the incident light. In the illustrated example, the PBP lens may have a phase delay about $\pi$ for surface-normal incident light (with an incident angle about) 0°, and thus may have a high diffraction efficiency for the incident light. As the incident angle or field of view increases with the increase of the viewing aperture, the phase delay may change and thus the diffraction efficiency may decrease as the viewing aperture increases. As described above, the low efficiencies at larger viewing apertures may lead to brightness drop and/or image ghosts. It is noted that curve 1410 is for illustration purposes only, and may not necessarily represent the diffraction efficiency of all PBP lenses as a function of the incident angle of the incident light.

FIG. 14B includes a curve 1420 illustrating an example of the retardance of a switchable waveplate including uniform liquid crystal structures (e.g., with a uniform liquid crystal alignment orientation and tilt angle) as a function of the incident angle (e.g., the zenith angle or polar angle) of the incident light. In the illustrated example, the switchable waveplate may have a retardance about 0.5 wavelengths (or zero) for surface-normal incident light (with an incident angle about 0°), and thus may have a low polarization leakage for the incident light. As the incident angle or field of view increases with the increase of the viewing aperture, the retardance may change, and thus the polarization leakage may increase as the viewing aperture increases. As described above, the polarization leakage at larger viewing apertures may degrade the displayed image quality, such as lower brightness, lower resolution, lower contrast, and/or ghost images. It is noted that curve 1420 is for illustration purposes only, and may not necessarily represent the retardance of all PBP lenses as a function of the incident angle of the incident light.

In some embodiments, a waveplate compensator with spatially varying alignment pattern orientations may be used to compensate for the retardance variation of the switchable waveplate in regions with different angles of interest, when the switchable waveplate is in the OFF state. The alignment pattern of the waveplate compensator may be determined based on the angles of interest at each region, and may be fabricated using, for example, photoalignment, nanoimprint, or other techniques as described above.

FIG. 15A illustrates an example of a switchable half-wave plate 1500 with no voltage signal applied (in the OFF state). Switchable half-wave plate 1500 may be an example of switchable waveplate 1100 or 1102, and may have uniform liquid crystal structures (e.g., uniform alignment orientation, pre-tilt angle, twist angle, etc.). When no voltage signal is applied, switchable half-wave plate 1500 may provide a half-wavelength retardation, and thus may convert surface-normally incident LHCP light into RHCP light, or convert surface-normally incident RHCP light into LHCP light. As described above, a waveplate compensator may be used to compensate for the retardance variation of the switchable waveplate in the OFF state.

FIG. 15B includes a polar plot illustrating the output Stokes parameter $S_{3O}$ of the output light of switchable half-wave plate 1500 with no voltage signal applied as shown in FIG. 15A. In the polar plot shown in FIG. 15B, the angular coordinate corresponds to the azimuth angle of the incident light, the radial (or polar) coordinate corresponds to the polar angle (the incident angle with respect to the surface-normal direction, also referred to as the zenith angle) of the incident light. FIG. 15B shows that, for incident light with an azimuth angle between 0° and 360° and polar angles between 0° and 30°, the absolute value of the output Stokes parameter Sao of the output light of the switchable half-wave plate 1500 is about 1. Therefore, the output light may be either RHCP light or LHCP light, with very low polarization leakage.

FIG. 15C illustrates the example of switchable half-wave plate 1500 with a voltage signal applied (in the ON state). The voltage signal may apply an electric field across the liquid crystal layer to realign the orientation of the liquid crystal molecules. The voltage signal may be sufficiently high (e.g., about 10V or higher), such that the liquid crystal molecules may be aligned with the electric field (e.g., in the z direction) and thus the retardance of switchable half-wave plate 1500 may be changed to, for example, about zero. As such, the polarization state of the output light from switchable half-wave plate 1500 may remain about the same as the polarization state of the input light.

FIG. 15D includes a polar plot illustrating the output Stokes parameter $S_{3O}$ of the output light of switchable half-wave plate 1500 with a voltage signal applied. FIG. 15D shows that, for incident light with larger polar angles (e.g., greater than about 5°, 10°, or higher), the absolute value of the output Stokes parameter Sao of the output light of switchable half-wave plate 1500 may be less than 1. Therefore, the output light may not be purely RHCP light or LHCP light, and may have higher polarization leakage. FIG. 15D also shows that the retardance may be different for incident light with different azimuth angles.

According to certain embodiments, to improve the performance of switchable waveplates for larger fields of view and/or off-axis incidence, switchable waveplates may be made to have spatially variable liquid crystal structures, and may be configured to apply spatially variable electric field to the liquid crystal structures in the ON state. For example, a switchable waveplate may have spatially variable LC alignment orientations across its aperture in the alignment layer, and may have spatially variable LC molecule pre-tilt angle with respect to the alignment layer with no voltage signal applied. The LC alignment orientation, LC molecule pre-tilt angle, and electric field applied at a position of the switchable waveplate can be selected to substantially align the LC molecules with the angle of interest (AOI) at the position, to reduce polarization leakage in the ON state for incident light from the AOI at the position. The spatially variable LC structures may be achieved using various fabrication techniques. In some embodiments, the switchable waveplate may include double twist nematic liquid crystal layers configured to achieve achromatic retardance and polarization conversion. In some embodiments, the switchable waveplate may include a patterned compensator that is configured to provide spatially mapped compensation for retardance variations in the OFF state when no voltage signal is applied to the switchable waveplate.

Figure 16A:
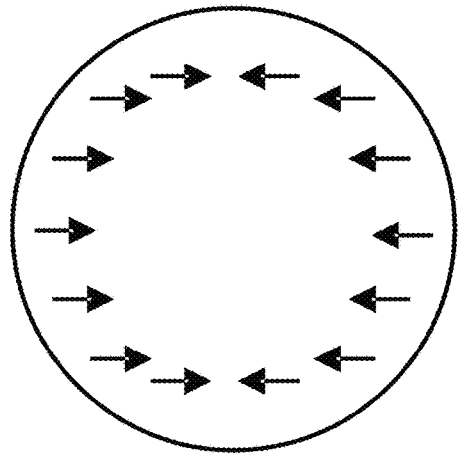
FIG. 16A illustrates an example of an alignment pattern of a switchable waveplate.

FIG. 16A illustrates an example of an alignment pattern of a switchable waveplate. In the example illustrated in FIG. 16A, the alignment pattern may be uniform as in the examples shown in FIGS. 11B and 11D. Therefore, as described above, the switchable waveplate may have high leakage in the OFF (or ON) state for incident light with large incident angles.

Figure 16B:
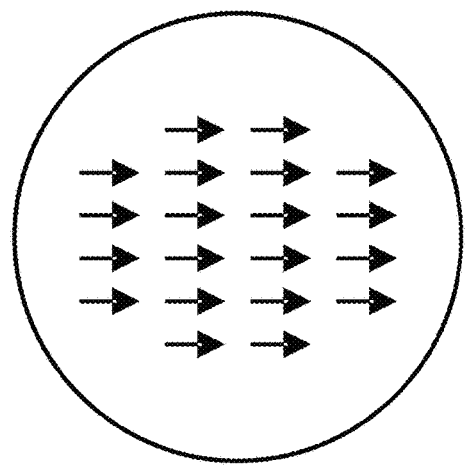
FIG. 16B illustrates an example of a spatially variable alignment pattern of a switchable waveplate according to certain embodiments.

FIG. 16B illustrates an example of a spatially variable alignment pattern of a switchable waveplate according to certain embodiments. The spatially variable alignment pattern may be designed based on the azimuth angle(s) of the angle(s) of interest at each region of the switchable waveplate, and may be formed by, for example, photoalignment or nanoimprint, as described above. It is noted that the alignment pattern shown in FIG. 16B is for illustration purposes only, and may not necessarily represent the alignment pattern for a specific switchable waveplate.

Figure 16C:
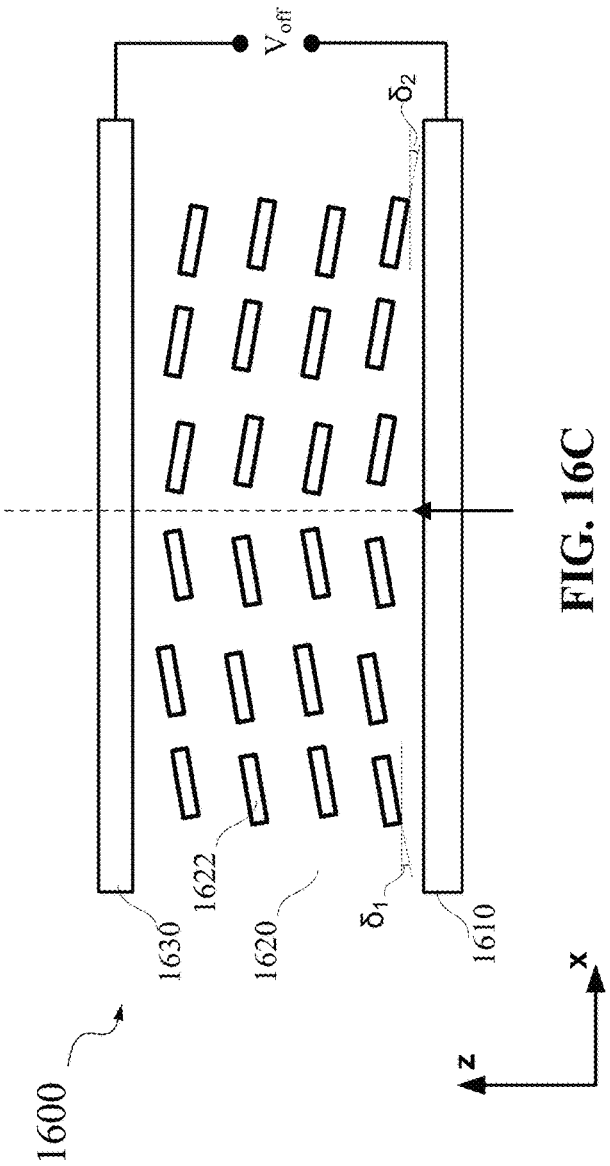
FIG. 16C illustrates an example of a switchable waveplate with pre-tilted liquid crystal molecules according to certain embodiments.

FIG. 16C illustrates an example of a switchable waveplate 1600 with pre-tilted liquid crystal molecules 1622 according to certain embodiments. FIG. 16C shows a first electrode layer 1610, a second electrode layer 1630, and a liquid crystal layer 1620 between first electrode layer 1610 and second electrode layer 1630. As illustrated, when no voltage signal is applied to liquid crystal layer 1620 through first electrode layer 1610 and second electrode layer 1630, liquid crystal molecules 1622 in liquid crystal layer 1620 may be pre-tilted with respect to the surfaces or the surface-normal direction of the electrode layers. The pre-tilt angle may be selected based on the zenith angles of the angles of interest at different regions of the switchable waveplate, and thus may be different for liquid crystal molecules at opposite sides with respect to the center of switchable waveplate 1600. In the example shown in FIG. 16C, liquid crystal molecules 1622 on the left side of the switchable waveplate may be tilted counter-clockwise (e.g., with positive tilt angles between about 1° and about 5°) with respect to first electrode layer 1610, whereas liquid crystal molecules 1622 on the right side of the switchable waveplate may be tilted clockwise (e.g., with negative tilt angles between about −1° and about −5°) with respect to first electrode layer 1610. In some embodiments, liquid crystal molecules 1622 on the left side of the switchable waveplate may have the same or similar pre-tilt angles oi, and liquid crystal molecules 1622 on the right side of the switchable waveplate may have the same or similar pre-tilt angles 62.

Figure 16D:
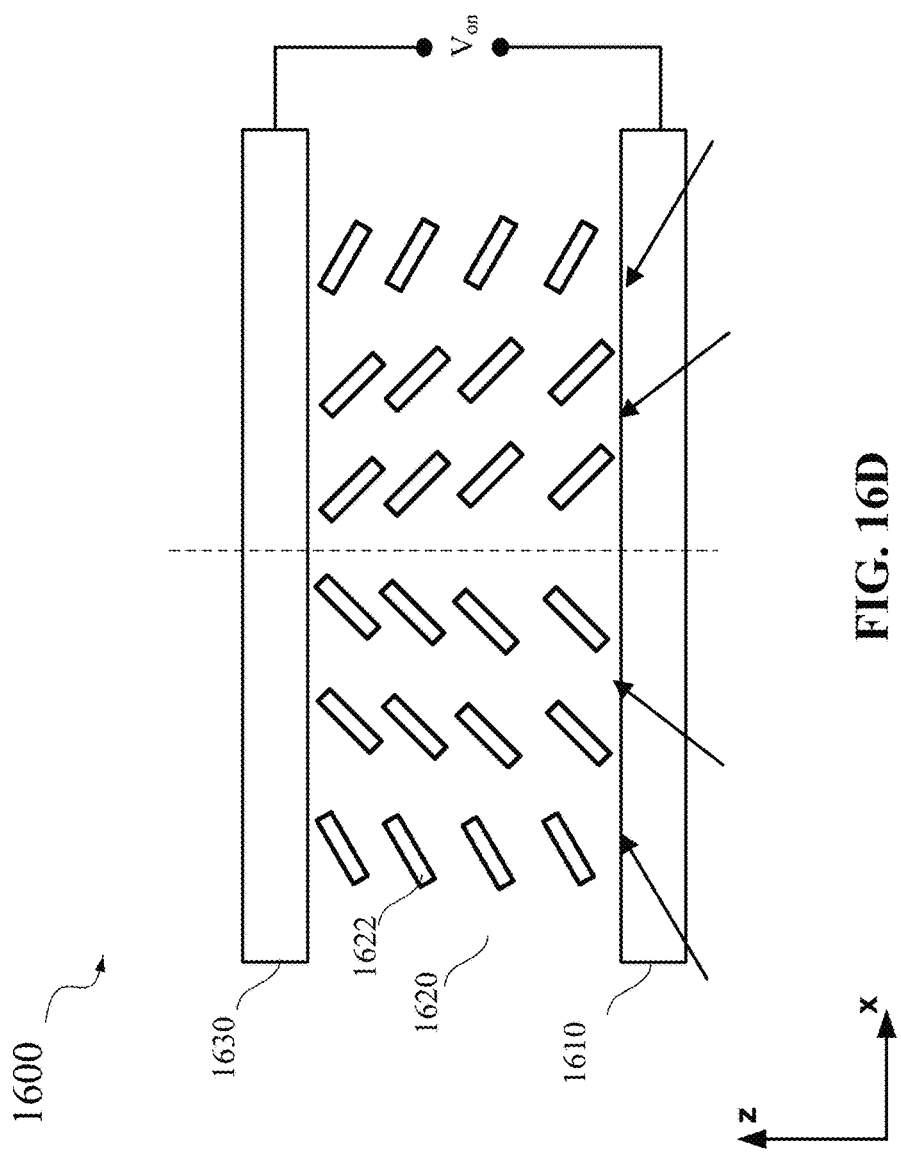
FIG. 16D illustrates an example of the tilt angles of liquid crystal molecules of the switchable waveplate of FIG. 16C with a voltage signal applied.

FIG. 16D illustrates an example of the tilt angles of liquid crystal molecules 1622 of switchable waveplate 1600 with a voltage signal applied. As described above, when a voltage signal is applied to liquid crystal layer 1620 through first electrode layer 1610 and second electrode layer 1630, the orientation of the liquid crystal molecules may be changed by the electric field. When the voltage signal is sufficiently high, the liquid crystal molecules may be substantially aligned with the direction of the electric field. When a uniform voltage signal (and thus a uniform electric field) is applied across switchable waveplate 1600, the orientations of the liquid crystal molecules may be approximately the same. In the illustrated example, since the liquid crystal molecules on opposite sides of switchable waveplate may have opposite pre-tilt angles, they may be rotated by the electric field in opposite directions. For example, liquid crystal molecules 1622 on the left side of the switchable waveplate may be further rotated (tilted) counter-clockwise by the electric field, while liquid crystal molecules 1622 on the right side of the switchable waveplate may be further rotated clockwise by the electric field. When a uniform voltage signal is applied across switchable waveplate 1600, the orientations of the liquid crystal molecules on each side of switchable waveplate 1600 may be approximately the same, which may not match the zenith angles of the angles of interest at different regions of the switchable waveplate.

Figure 17:
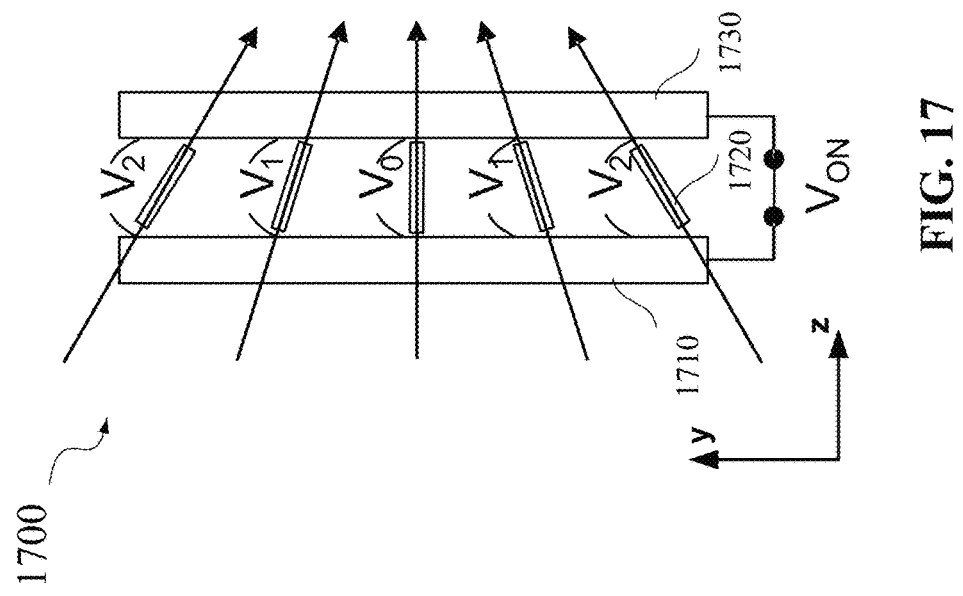
FIG. 17 illustrates an example of a switchable waveplate with pre-tilted liquid crystal molecules and a gradient electric field applied to the switchable waveplate according to certain embodiments.

FIG. 17 illustrates an example of a switchable waveplate 1700 with pre-tilted liquid crystal molecules and a gradient electric field applied to the switchable waveplate according to certain embodiments. Switchable waveplate 1700 may include a first electrode layer 1710, a second electrode layer 1730, and a liquid crystal layer 1720 between first electrode layer 1710 and second electrode layer 1730. First electrode layer 1710 and second electrode layer 1730 may be configured to applied different voltage signals (and electric fields) to different regions of switchable waveplate 1700. For example, in the example illustrated in FIG. 17, a first voltage signal $V_0$ may be applied to a center region of switchable waveplate 1700, a second voltage signal $V_1$ may be applied to a second region outside of the center region of switchable waveplate 1700, and a third voltage signal $V_2$ may be applied to a third region at edges of switchable waveplate 1700.

First voltage signal $V_0$ may be sufficiently high such that it may rotate the liquid crystal molecules in the center region of switchable waveplate 1700 to align with the applied electric field (e.g., in the z direction, or perpendicular to first electrode layer 1710 or second electrode layer 1730). Second voltage signal $V_1$ may be lower than first voltage signal $V_0$. Second voltage signal $V_1$ may rotate the liquid crystal molecules in the second region of switchable waveplate 1700 by a first tilt angle, but may not rotate the liquid crystal molecules in the second region of switchable waveplate 1700 to substantially align with the applied electric field. Third voltage signal $V_2$ may be lower than second voltage signal $V_1$. Third voltage signal $V_2$ may rotate the liquid crystal molecules in the third region of switchable waveplate 1700 by a second tilt angle that is smaller than the first tilt angle, and thus may not rotate the liquid crystal molecules in the third region of switchable waveplate 1700 to substantially align with the applied electric field either.

In addition, as described above, the liquid crystal molecules on opposite sides of the center of the switchable waveplate may be pre-tilted in opposite directions. Therefore, when a same electric field is applied to the opposite sides, the liquid crystal molecules on the opposite sides may be rotated by a same angular value in opposite directions.

As such, when the different voltage signals are applied to different regions of switchable waveplate 1700 as shown in FIG. 17, the title angle (or the directrix or long axis) of the liquid crystal molecules in each region may be approximately the same as the angle of interest for the region. Therefore, incident light from the angle of interest may experience little or no birefringence, and thus may have little or no phase retardation for light of different polarizations states. As such, there may not be polarization leakage when switchable waveplate 1700 is in the ON state (e.g., zero retardance).

Figure 18A:
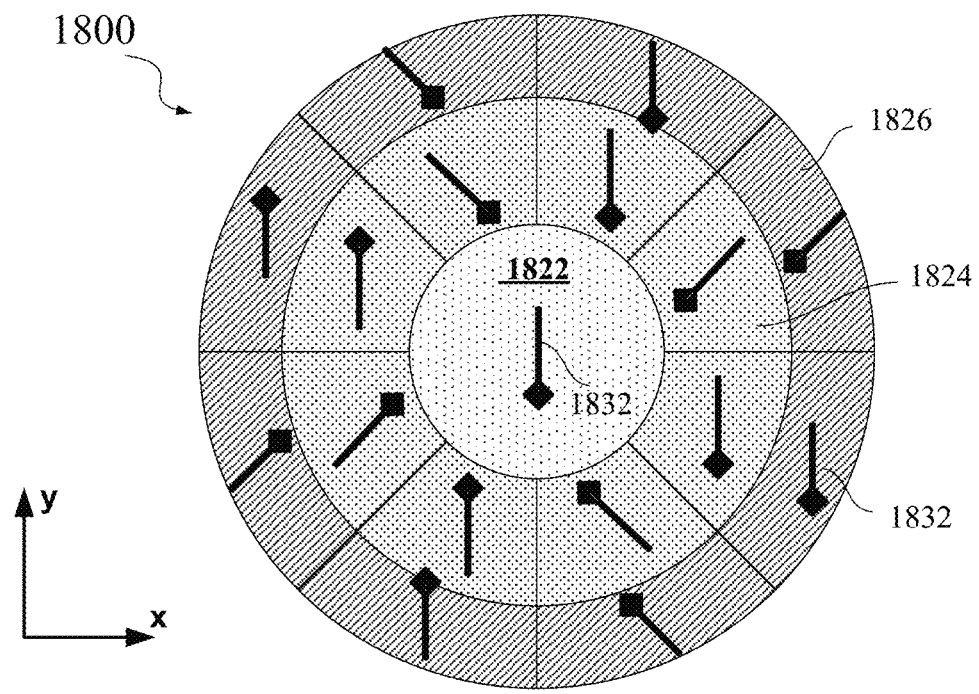
FIGS. 18A and 18B illustrate an example of a switchable waveplate with spatially varying liquid crystal structures and spatially varying electric field applied according to certain embodiments.
Figure 18B:
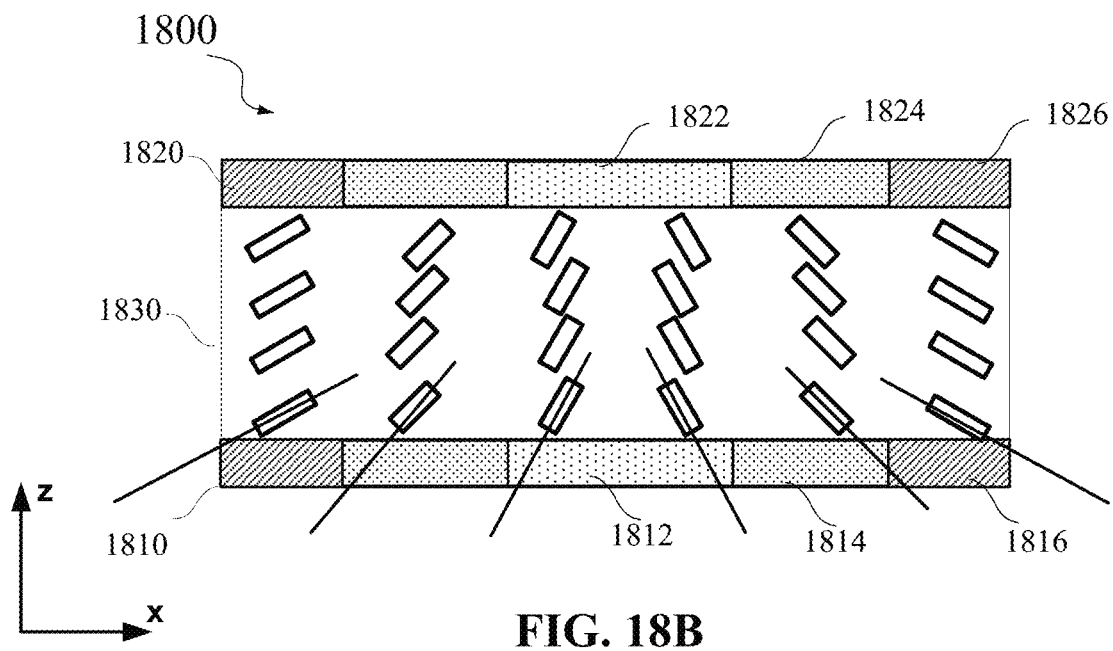

FIGS. 18A and 18B illustrate an example of a switchable waveplate 1800 with spatially varying liquid crystal structures (e.g., spatially varying alignment pattern orientation and pre-tilt angle) and spatially varying electric field applied according to certain embodiments. Switchable waveplate 1800 may be an example of switchable waveplate 1700. FIG. 18A is a top view of switchable waveplate 1800. FIG. 18B is a side view of switchable waveplate 1800. Switchable waveplate 1800 may include a first electrode layer 1810, a second electrode layer 1820, and a liquid crystal layer 1830 between first electrode layer 1810 and second electrode layer 1820. Switchable waveplate 1800 may include multiple regions having different liquid crystal molecule alignment orientations and different liquid crystal molecule pre-tilt angles. The multiple regions may be controlled by two or more voltage signals through two or more pairs of electrodes.

In the example illustrated in FIG. 18A, switchable waveplate 1800 may include a center region controlled by a pair of electrodes 1812 and 1822. The liquid crystal molecule alignment pattern in the center region may have a uniform orientation as indicated by an arrow 1832. Liquid crystal molecules in the center region may or may not be pre-tilted when no voltage signal is applied. Switchable waveplate 1800 may also include a plurality of edge regions controlled by a pair of electrodes 1816 and 1826. The plurality of edge regions may be different sectors of a ring-shaped zone and may correspond to a plurality of azimuth angle ranges, where the liquid crystal molecule alignment orientation in each edge region as indicated by an arrow 1832 may be determined based on the corresponding azimuth angle range. Liquid crystal molecules in each edge region may be pre-tilted as described above with respect to, for example, FIG. 16C, where edge regions on opposite sides of the center region may have opposite pre-tilt angles. Switchable waveplate 1800 may also include a plurality of middle regions controlled by a pair of electrodes 1814 and 1824. The plurality of middle regions may be different sectors of a ring-shaped zone between the center region and the edge regions, and may correspond to a plurality of azimuth angle ranges. The liquid crystal molecule alignment orientation in each middle region as shown by an arrow 1832 may be determined based on the corresponding azimuth angle range. Liquid crystal molecules in each middle region may be pre-tilted as described above with respect to, for example, FIG. 16C, where middle regions on opposite sides of the center region may have opposite pre-tilt angles. A middle region and an edge region that correspond to the same azimuth angle range may have the same liquid crystal molecule alignment orientation, and the same pre-tilt angle (e.g., between about 1° and 5°, or between about −1° and −5°), but may be controlled by different electrodes or otherwise receive different voltage signals or electric fields. For example, the center region, middle regions, and edge regions may receive different voltage signals through different pairs of electrodes.

It is noted that FIG. 18A is for illustration purposes only. There may be many different ways to divide switchable waveplate 1800 into multiple regions or zones having different structures and configurations, and there may be many different ways to apply different voltage signals or electric fields to different regions of switchable waveplate 1800. For example, switchable waveplate 1800 can be divided into a center zone and one or more (e.g., two or more) ring-shaped zones, where each ring-shaped zone may be controlled by a same voltage signal and may be divided into many (e.g., 4, 6, 8, 10, or more) sectors corresponding to different azimuth angle ranges and having different liquid crystal structures (e.g., different alignment orientations and/or different pre-tilt angles). It is also noted that arrows 1832 with different orientations as shown in FIG. 18A are for illustration purposes only to show that different angular regions may have different liquid crystal molecule alignment orientations, and are not necessarily indicating the actual orientations of the alignment patterns of an actual switchable waveplate.

In some embodiments, either one of first electrode layer 1810 and second electrode layer 1820 may be a common electrode layer that is not divided into multiple zones, and the other one of first electrode layer 1810 and second electrode layer 1820 may include multiple electrically isolated zones configured to receive different voltage signals. In some embodiments, different zones of an electrode layer may be connected through resistive devices, and a voltage signal may be applied to a first zone (e.g., the center zone) and may be attenuated by the resistive devices such that the voltage levels at the different zones of the electrode layer may be different. In some embodiments, an electrode layer may include a material having a certain resistivity, such that the voltage levels at different zones of the electrode layer may be different when a voltage signal is applied to one zone (e.g., the center zone) of the electrode layer.

In the example shown in FIG. 18B, three different voltage signals may be applied to the center region, the middle regions, and the edge regions, respectively. The center region may receive a signal with a higher voltage level (e.g., about 10V) that may tilt the liquid crystal molecules by a large tilt angle. The middle regions may receive a signal with a lower voltage level (e.g., about 5V or 3 V) that may tilt the liquid crystal molecules by a smaller tilt angle that may be approximately equal to the zenith angles of the angles of interest of the middle regions. The edge regions may receive a signal with an even lower voltage level (e.g., about 2.5V, 2V, or lower) that may tilt the liquid crystal molecules by an even smaller tilt angle that may be approximately equal to the zenith angles of the angles of interest of the edge regions. In this way, the title angle (or the directrix or long axis) of the liquid crystal molecules in each region may be approximately the same as the zenith angle of the angle of interest for the region. Therefore, the incident light from the angles of interest may experience no birefringence, and thus may have no phase retardation between light of different polarizations states. As such, there may be little or no polarized leakage when switchable waveplate 1800 is in the ON state (e.g., zero retardance).

Figure 19A:
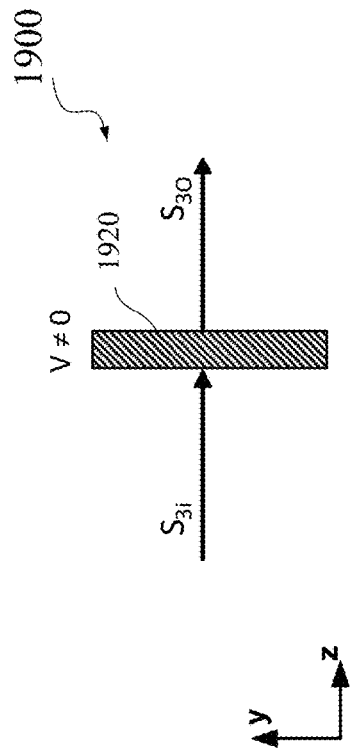
FIG. 19A illustrates an example of a switchable half-wave plate with no voltage applied.

FIG. 19A illustrates an example of a switchable half-wave plate 1900 according to certain embodiments with no voltage signal applied (in the OFF state). Switchable half-wave plate 1900 may be an example of switchable waveplate 1600, 1700, or 1800. Switchable half-wave plate 1900 may have non-uniform liquid crystal structures (e.g., non-uniform alignment orientations, pre-tilt angles, etc.), and may be configured to receive different voltage signals at different regions as described above with respect to, for example, FIGS. 17-18B. When no voltage signal is applied, switchable half-wave plate 1900 may provide a half-wavelength retardation between orthogonally polarized light, and thus may convert surface-normally incident LHCP light into RHCP light, or convert surface-normally incident RHCP light into LHCP light. As described above, in some embodiments, a waveplate compensator with a spatially varying alignment pattern orientation may be used to compensate for the retardance variation of switchable half-wave plate 1900 in regions with different angles of interest when the switchable waveplate is in the OFF state.

Figure 19C:
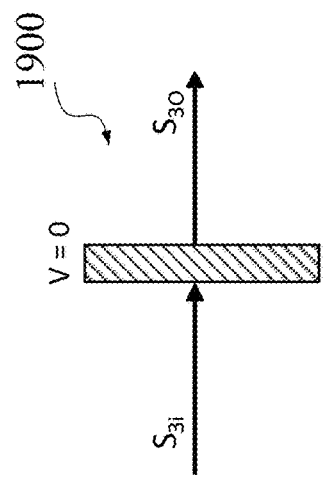
FIG. 19C illustrates an example of a switchable half-wave plate according to certain embodiments with one or more voltage signals applied (in the ON state).
Figure 19B:
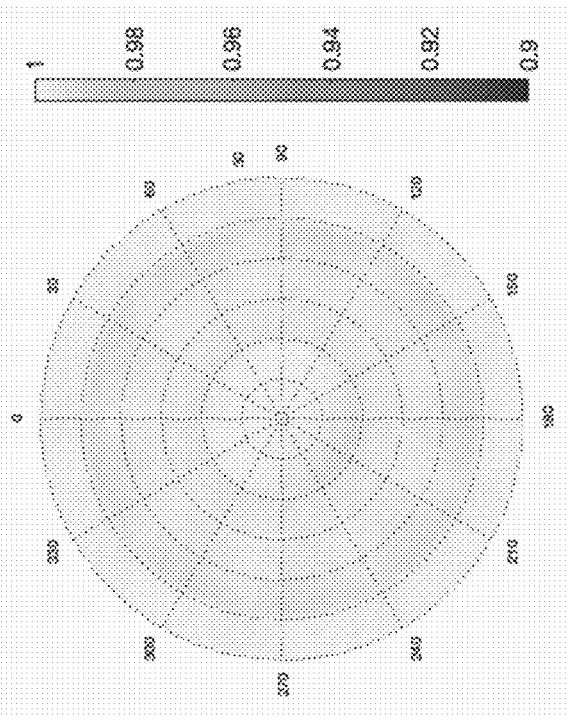
FIG. 19B illustrates the output Stokes parameter $S_{3O}$ of the output light of the switchable half-wave plate of FIG. 19A with no voltage signal applied.

FIG. 19B illustrates the output Stokes parameter Sao of the output light of switchable half-wave plate 1900 with no voltage signal applied as shown in FIG. 19A. In the polar plot shown in FIG. 19B, the angular coordinate corresponds to the azimuth angle of the incident light, the radial (polar) coordinate corresponds to the polar angle (or zenith angle) of the incident light. FIG. 19B shows that, for incident light with azimuth angles between 0° and 360° and polar angles between 0° and about 30°, the absolute value of the output Stokes parameter Sao of the output light of switchable half-wave plate 1900 is about 1, and thus the output light may be either RHCP light or LHCP light with very low polarization leakage.

FIG. 19C illustrates the example of switchable half-wave plate 1900 according to certain embodiments with one or more voltage signals applied (in the ON state). As described above, different voltage signals may be applied to different regions of switchable half-wave plate 1900. The voltage signals may apply electric fields of different magnitudes across different regions of the liquid crystal layer to align the liquid crystal molecules differently in the different regions, such that the tilt angles (or the long axes) of the liquid crystal molecules in each region may match the angle(s) of interest in the region. As such, there may be zero phase retardance between light of orthogonal polarization states, and thus the polarization state of the output light from switchable half-wave plate 1900 may remain about the same as the polarization state of the input light.

Figure 19D:
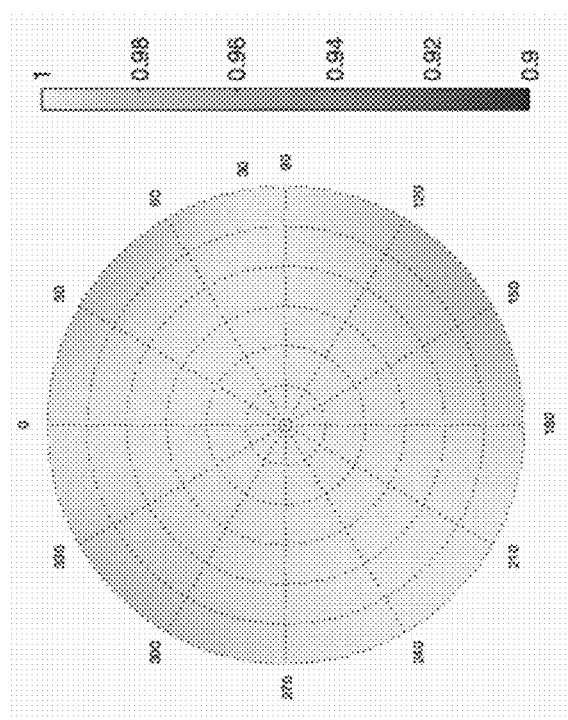
FIG. 19D illustrates the output Stokes parameter $S_{3O}$ of the output light of the switchable half-wave plate of FIG. 19C with one or more voltage signals applied.

FIG. 19D illustrates the output Stokes parameter Sao of the output light of switchable half-wave plate 1900 with one or more voltage signals applied. FIG. 19D shows that, for incident light with azimuth angles between 0° and 360° and polar angles between 0° and about 30°, the absolute value of the output Stokes parameter Sao of the output light of switchable half-wave plate 1500 is close to 1, and thus the output light may be either RHCP light or LHCP light with very low polarization leakage. In addition, switchable half-wave plate 1900 may have the same zero retardance for incident light with different azimuth angles.

Embodiments disclosed herein may be used to implement components of an artificial reality system or may be implemented in conjunction with an artificial reality system. Artificial reality is a form of reality that has been adjusted in some manner before presentation to a user, which may include, for example, a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

Figure 20:
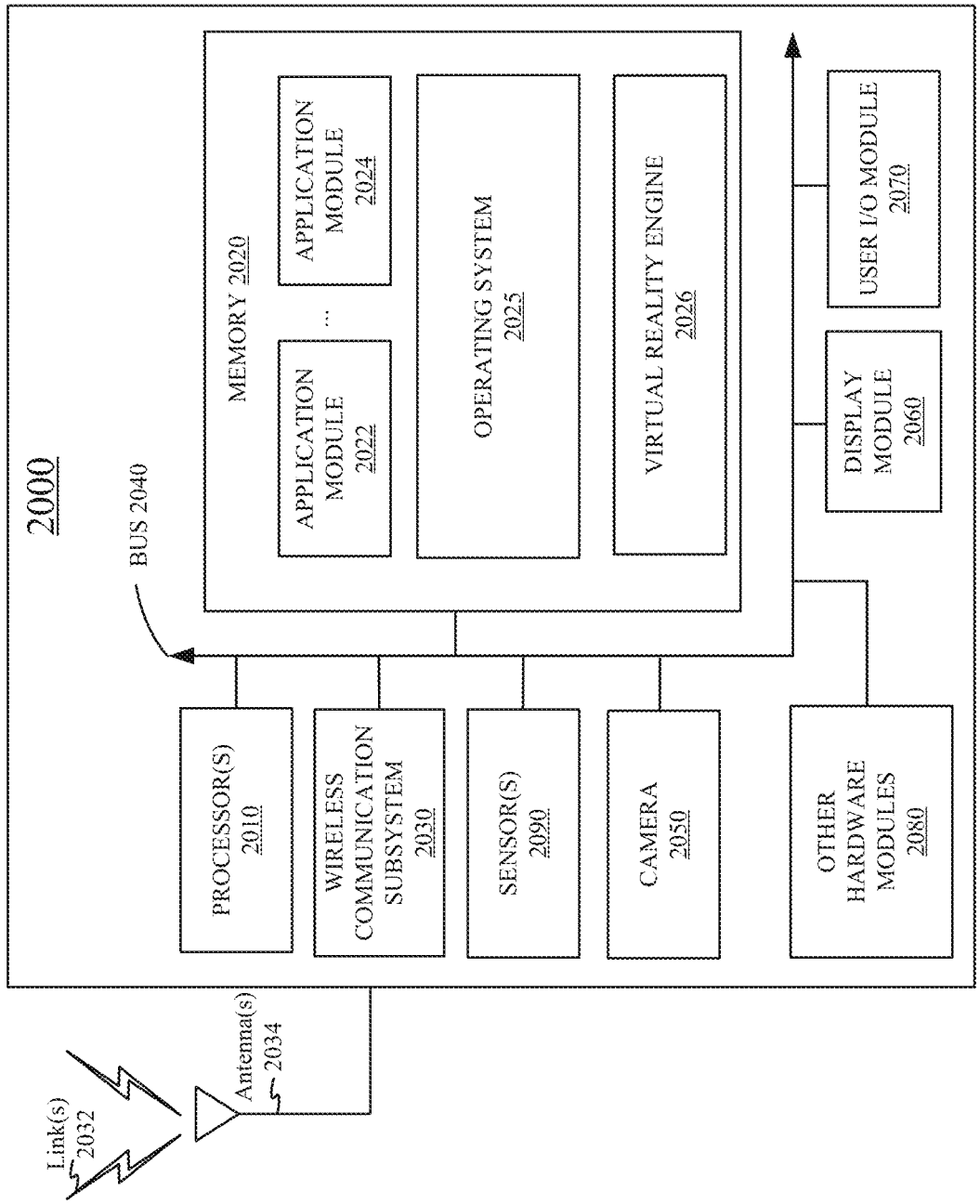
FIG. 20 is a simplified block diagram of an example of an electronic system of a near-eye display for implementing some of the examples disclosed herein.

FIG. 20 is a simplified block diagram of an example of an electronic system 2000 of a near-eye display (e.g., HMD device) for implementing some of the examples disclosed herein. Electronic system 2000 may be used as the electronic system of an HMD device or other near-eye displays described above. In this example, electronic system 2000 may include one or more processor(s) 2010 and a memory 2020. Processor(s) 2010 may be configured to execute instructions for performing operations at a number of components, and can be, for example, a general-purpose processor or microprocessor suitable for implementation within a portable electronic device. Processor(s) 2010 may be communicatively coupled with a plurality of components within electronic system 2000. To realize this communicative coupling, processor(s) 2010 may communicate with the other illustrated components across a bus 2040. Bus 2040 may be any subsystem adapted to transfer data within electronic system 2000. Bus 2040 may include a plurality of computer buses and additional circuitry to transfer data.

Memory 2020 may be coupled to processor(s) 2010. In some embodiments, memory 2020 may offer both short-term and long-term storage and may be divided into several units. Memory 2020 may be volatile, such as static random access memory (SRAM) and/or dynamic random access memory (DRAM) and/or non-volatile, such as read-only memory (ROM), flash memory, and the like. Furthermore, memory 2020 may include removable storage devices, such as secure digital (SD) cards. Memory 2020 may provide storage of computer-readable instructions, data structures, program modules, and other data for electronic system 2000.

In some embodiments, memory 2020 may store a plurality of application modules 2022 through 2024, which may include any number of applications. Examples of applications may include gaming applications, conferencing applications, video playback applications, or other suitable applications. The applications may include a depth sensing function or eye tracking function. Application modules 2022-2024 may include particular instructions to be executed by processor(s) 2010. In some embodiments, certain applications or parts of application modules 2022-2024 may be executable by other hardware modules 2080. In certain embodiments, memory 2020 may additionally include secure memory, which may include additional security controls to prevent copying or other unauthorized access to secure information.

In some embodiments, memory 2020 may include an operating system 2025 loaded therein. Operating system 2025 may be operable to initiate the execution of the instructions provided by application modules 2022-2024 and/or manage other hardware modules 2080 as well as interfaces with a wireless communication subsystem 2030 which may include one or more wireless transceivers. Operating system 2025 may be adapted to perform other operations across the components of electronic system 2000 including threading, resource management, data storage control and other similar functionality.

Wireless communication subsystem 2030 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 2000 may include one or more antennas 2034 for wireless communication as part of wireless communication subsystem 2030 or as a separate component coupled to any portion of the system. Depending on desired functionality, wireless communication subsystem 2030 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 2030 may permit data to be exchanged with a network, other computer systems, and/or any other devices described herein. Wireless communication subsystem 2030 may include a means for transmitting or receiving data, such as identifiers of HMD devices, position data, a geographic map, a heat map, photos, or videos, using antenna(s) 2034 and wireless link(s) 2032.

Embodiments of electronic system 2000 may also include one or more sensors 2090. Sensor(s) 2090 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor.

Electronic system 2000 may include a display module 2060. Display module 2060 may be a near-eye display, and may graphically present information, such as images, videos, and various instructions, from electronic system 2000 to a user. Such information may be derived from one or more application modules 2022-2024, virtual reality engine 2026, one or more other hardware modules 2080, a combination thereof, or any other suitable means for resolving graphical content for the user (e.g., by operating system 2025). Display module 2060 may use LCD technology, LED technology (including, for example, OLED, ILED, µ-LED, AMO-LED, TOLED, etc.), light emitting polymer display (LPD) technology, or some other display technology.

Electronic system 2000 may include a user input/output module 2070. User input/output module 2070 may allow a user to send action requests to electronic system 2000. An action request may be a request to perform a particular action. For example, an action request may be to start or end an application or to perform a particular action within the application. User input/output module 2070 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 2000. In some embodiments, user input/output module 2070 may provide haptic feedback to the user in accordance with instructions received from electronic system 2000. For example, the haptic feedback may be provided when an action request is received or has been performed.

Electronic system 2000 may include a camera 2050 that may be used to take photos or videos of a user, for example, for tracking the user's eye position. Camera 2050 may also be used to take photos or videos of the environment, for example, for VR, AR, or MR applications. Camera 2050 may include, for example, a complementary metal-oxide-semiconductor (CMOS) image sensor with a few millions or tens of millions of pixels. In some implementations, camera 2050 may include two or more cameras that may be used to capture 3-D images.

In some embodiments, electronic system 2000 may include a plurality of other hardware modules 2080. Each of other hardware modules 2080 may be a physical module within electronic system 2000. While each of other hardware modules 2080 may be permanently configured as a structure, some of other hardware modules 2080 may be temporarily configured to perform specific functions or temporarily activated. Examples of other hardware modules 2080 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 2080 may be implemented in software.

In some embodiments, memory 2020 of electronic system 2000 may also store a virtual reality engine 2026. Virtual reality engine 2026 may execute applications within electronic system 2000 and receive position information, acceleration information, velocity information, predicted future positions, or any combination thereof of the HMD device from the various sensors. In some embodiments, the information received by virtual reality engine 2026 may be used for producing a signal (e.g., display instructions) to display module 2060. For example, if the received information indicates that the user has looked to the left, virtual reality engine 2026 may generate content for the HMD device that mirrors the user's movement in a virtual environment. Additionally, virtual reality engine 2026 may perform an action within an application in response to an action request received from user input/output module 2070 and provide feedback to the user. The provided feedback may be visual, audible, or haptic feedback. In some implementations, processor(s) 2010 may include one or more GPUs that may execute virtual reality engine 2026.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and" and "or," as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or any combination of A, B, and/or C, such as AB, AC, BC, AA, ABC, AAB, AABBCCC, or the like.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A switchable waveplate comprising:
a substrate;
a first electrode layer on the substrate;
an alignment layer on the first electrode layer and including alignment patterns formed thereon, wherein the alignment patterns are determined based on angles of interest at a plurality of regions of the switchable waveplate;
a liquid crystal layer on the alignment layer, the liquid crystal layer including liquid crystal molecules that are arranged according to the alignment patterns and are pre-tilted when no electric field is applied to the liquid crystal layer; and
a second electrode layer on the liquid crystal layer,
wherein the first electrode layer and the second electrode layer are configured to apply electric fields of different magnitudes to a plurality of zones of the switchable waveplate, and
wherein the plurality of zones of the switchable waveplate includes a center zone and one or more ring-shaped zones.

2. The switchable waveplate of claim 1, wherein liquid crystal molecules on opposite sides of a center of the liquid crystal layer are pre-tilted in opposite directions.

3. The switchable waveplate of claim 1, wherein the liquid crystal molecules are pre-tilted by angles between 1° and 5°.

4. The switchable waveplate of claim 1, wherein the liquid crystal layer includes two twisted nematic liquid crystal sublayers with opposite liquid crystal twist angles along a surface-normal direction of the substrate.

5. The switchable waveplate of claim 4, wherein the two twisted nematic liquid crystal sublayers are characterized by liquid crystal twist angels of −70° and 70°, respectively.

6. The switchable waveplate of claim 1, wherein at least one of the first electrode layer or the second electrode layer includes electrically isolated zones configured to receive different voltage signals.

7. The switchable waveplate of claim 1, wherein at least one of the first electrode layer or the second electrode layer includes a conductive material characterized by a first electric resistivity that is selected to generate a voltage gradient from a center to an edge of the switchable waveplate.

8. The switchable waveplate of claim 7, wherein a total voltage drop from the center to the edge of the switchable waveplate is greater than 5 V.

9. The switchable waveplate of claim 1, wherein:
each ring-shaped zone of the one or more ring-shaped zones includes a plurality of sectors corresponding to a plurality of azimuth angle ranges;
each sector of the plurality of sectors includes a region of the plurality of regions; and
the alignment layer in each sector of the plurality of sectors is characterized by a respective alignment pattern orientation.

10. The switchable waveplate of claim 1, wherein the alignment patterns, pre-tilt angles of the liquid crystal molecules, and the electric fields of different magnitudes applied to the plurality of zones of the switchable waveplate are selected to align long axes of liquid crystal molecules in each region of the plurality of regions of the switchable waveplate with an angle of interest at the region of the plurality of regions of the switchable waveplate.

11. A near-eye display system comprising:
a light source;
a polarizer configured to polarize light emitted by the light source;
a first polarization sensitive lens characterized by different optical power for light of two different polarization states; and
a switchable waveplate between the polarizer and the first polarization sensitive lens, the switchable waveplate including:
a substrate;
a first electrode layer on the substrate;
an alignment layer on the first electrode layer and including alignment patterns formed thereon, wherein the alignment patterns are determined based on angles of interest at a plurality of regions of the switchable waveplate;
a liquid crystal layer on the alignment layer, the liquid crystal layer including liquid crystal molecules that are arranged according to the alignment patterns and are pre-tilted when no electric field is applied to the liquid crystal layer; and
a second electrode layer on the liquid crystal layer,
wherein the first electrode layer and the second electrode layer are configured to apply electric fields of different magnitudes to a plurality of zones of the switchable waveplate, and wherein the plurality of zones of the switchable waveplate includes a center zone and one or more ring-shaped zones.

12. The near-eye display system of claim 11, wherein liquid crystal molecules on opposite sides of a center of the liquid crystal layer are pre-tilted in opposite directions.

13. The near-eye display system of claim 11, wherein:
the switchable waveplate is an achromatic waveplate when no electric field is applied to the liquid crystal layer; and
the liquid crystal layer includes two twisted nematic liquid crystal sublayers with opposite liquid crystal twist angles along a surface-normal direction of the substrate.

14. The near-eye display system of claim 11, wherein at least one of the first electrode layer or the second electrode layer includes electrically isolated zones configured to receive different voltage signals.

15. The near-eye display system of claim 11, wherein at least one of the first electrode layer or the second electrode layer includes a conductive material characterized by a first electric resistivity that is selected to generate a voltage gradient from a center to an edge of the switchable waveplate.

16. The near-eye display system of claim 11, wherein the alignment patterns, pre-tilt angles of the liquid crystal molecules, and the electric fields of different magnitudes applied to the plurality of zones of the switchable waveplate are selected to align long axes of liquid crystal molecules in each region of the plurality of regions of the switchable waveplate with an angle of interest at the region of the plurality of regions of the switchable waveplate.

17. The near-eye display system of claim 11, further comprising a second polarization sensitive lens, wherein the second polarization sensitive lens is between the polarizer and the switchable waveplate, or between the switchable waveplate and the first polarization sensitive lens.

18. The near-eye display system of claim 11, further comprising a retardance compensator configured to compensate retardance variation of the switchable waveplate when no electric field is applied to the liquid crystal layer.

* * * * *